US010889093B2

(12) United States Patent
Wang

(10) Patent No.: US 10,889,093 B2
(45) Date of Patent: Jan. 12, 2021

(54) DIMENSIONALLY STABLE RECYCLABLE PLASTIC PACKAGE

(71) Applicant: Colgate-Palmolive Company, New York, NY (US)

(72) Inventor: Jun Wang, Fort Washington, PA (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 16/721,472

(22) Filed: Dec. 19, 2019

(65) Prior Publication Data

US 2020/0353731 A1    Nov. 12, 2020

Related U.S. Application Data

(60) Provisional application No. 62/843,691, filed on May 6, 2019.

(51) Int. Cl.
*B32B 27/32* (2006.01)
*B32B 27/08* (2006.01)
*B32B 7/035* (2019.01)
*B32B 27/30* (2006.01)

(52) U.S. Cl.
CPC .............. *B32B 27/32* (2013.01); *B32B 27/08* (2013.01); *B32B 27/306* (2013.01); *B32B 2250/24* (2013.01); *B32B 2270/00* (2013.01); *B32B 2323/043* (2013.01); *B32B 2323/046* (2013.01); *B32B 2439/70* (2013.01)

(58) Field of Classification Search
CPC ....... B32B 27/32; B32B 27/08; B32B 27/306; B32B 2250/24; B32B 2270/00; B32B 2323/043; B32B 2323/046; B32B 2439/70; B29L 2009/00; B29L 2023/001; B29L 2023/22; B29K 2995/0053; B29C 35/041; B29C 35/06; B29C 53/10; B29C 55/28; B29B 13/024
See application file for complete search history.

(56) References Cited

U.S. PATENT DOCUMENTS

| | | | |
|---|---|---|---|
| 2010/0015423 A1 | 1/2010 | Schaefer et al. | |
| 2010/0279046 A1 | 11/2010 | Ashman | |
| 2016/0339663 A1* | 11/2016 | Clare | ........................ B32B 1/02 |
| 2018/0354241 A1 | 12/2018 | Gilbert | |

FOREIGN PATENT DOCUMENTS

| | | |
|---|---|---|
| WO | 2014/005214 | 1/2014 |
| WO | 2018/070945 | 4/2018 |
| WO | 2018/202479 | 11/2018 |
| WO | 2019/172932 | 9/2019 |

OTHER PUBLICATIONS

International Search Report and the Written Opinion of the International Searching Authority issued in International Application PCT/US2020/070023 dated Oct. 7, 2020.

* cited by examiner

*Primary Examiner* — Yan Lan

(57) ABSTRACT

Described herein is a sheet comprising: a multi-layer structure comprising: a plurality of layers including an uppermost layer and a lowermost layer, each of the plurality of layers having a molecular orientation that results in a stress value for each layer; wherein the stress value of at least two of the plurality of layers are non-zero and different from one another; and wherein the multi-layer structure has a net stress value that is less than the greater stress value of the plurality of layers.

10 Claims, 18 Drawing Sheets

DIMENSIONALLY STABLE RECYCLABLE PLASTIC PACKAGE

BACKGROUND

Recycling is a way to prevent waste material from being deposited in a landfill. Currently, rigid packaging, such as polyethylene terephthalate (PET) bottles and high-density polyethylene (HDPE) bottles, may be recycled. However, flexible packaging, such as (e.g., toothpaste) tubes, may not be recycled due to the tubes being made from multiple different plastics, such as low-density polyethylene (LDPE), linear low-density polyethylene (LLDPE), HDPE, polypropylene (PP), ethylene vinyl alcohol (EVOH), aluminum foil, and mixtures of these materials are not recyclable. Furthermore, other flexible materials that may be recyclable may not be suitable as a packaging material because such flexible material exhibit poor dimensional stability, which causes such material to curl onto itself making it unsuitable as a packaging material. Therefore, a need exists for a recyclable packaging material that is not only flexible but also exhibits dimensional stability.

BRIEF SUMMARY

Some embodiments of the present invention include a sheet comprising: a multi-layer structure comprising: a plurality of layers including an uppermost layer and a lowermost layer, each of the plurality of layers having a molecular orientation that results in a stress value for each layer; wherein the stress value of at least two of the plurality of layers are non-zero and different from one another; and wherein the multi-layer structure has a net stress value that is less than the greater stress value of the plurality of layers.

In other embodiments, the present invention includes a sheet comprising: a first web comprising at least one layer formed of high-density polyethylene; a sheet intermediate layer having a first major surface opposite a second major surface; a second web comprising at least one layer formed of high-density polyethylene and a barrier layer; and the first web laminated to the first major surface of the sheet intermediate layer and the second web laminated to the second major surface of the sheet intermediate layer.

In other embodiments, the present invention includes an oral care packaging comprising a flexible tube formed from one of the aforementioned sheets.

In other embodiments, the present invention includes a method of forming a sheet comprising: a) forming a first multi-layer web by a first blown-film process or a first cast film process and a second multi-layer web by a second blown-film process or a second cast film process, and b) laminating together the first multi-layer web, an intermediate layer formed of polyolefin, and the second multi-layer web to form the sheet.

In other embodiments, the present invention includes a multi-layer structure comprising: a first polyolefin layer comprising high-density polyethylene; a second polyolefin layer comprising high-density polyethylene; a third polyolefin layer comprising high-density polyethylene; a fourth polyolefin layer comprising high-density polyethylene; a first barrier tie layer; a barrier layer; a second barrier tie layer; a fifth polyolefin layer comprising high-density polyethylene; and a sixth polyolefin layer comprising linear low-density polyethylene.

In other embodiments, the present invention includes a multi-layer structure which consists of: a first polyolefin layer comprising high-density polyethylene; a second polyolefin layer comprising high-density polyethylene; a third polyolefin layer comprising high-density polyethylene; a fourth polyolefin layer comprising high-density polyethylene; a first barrier tie layer; a barrier layer; a second barrier tie layer; a fifth polyolefin layer comprising high-density polyethylene; and a sixth polyolefin layer comprising linear low-density polyethylene.

In other embodiments, the present invention includes a multi-layer structure which consists of: a first polyolefin layer comprising high-density polyethylene; a second polyolefin layer comprising high-density polyethylene and titanium dioxide; a third polyolefin layer comprising high-density polyethylene and titanium dioxide; a fourth polyolefin layer comprising high-density polyethylene; a first barrier tie layer; a barrier layer; a second barrier tie layer; a fifth polyolefin layer comprising high-density polyethylene; and a sixth polyolefin layer comprising linear low-density polyethylene.

Other embodiments of the present invention include a multi-layer structure comprising: a first polyolefin layer comprising high-density polyethylene; a second polyolefin layer comprising high-density polyethylene; a third polyolefin layer comprising high-density polyethylene; a fourth polyolefin layer comprising high-density polyethylene; a fifth polyolefin layer comprising high-density polyethylene; a sixth polyolefin layer comprising high-density polyethylene; a seventh polyolefin layer comprising high-density polyethylene; an eighth polyolefin layer comprising high-density polyethylene; a first barrier tie layer; a barrier layer; a second barrier tie layer; a ninth polyolefin layer comprising high-density polyethylene; and a tenth polyolefin layer comprising linear low-density polyethylene.

Other embodiments of the present invention include a multi-layer structure which consists of: a first polyolefin layer comprising high-density polyethylene; a second polyolefin layer comprising high-density polyethylene; a third polyolefin layer comprising high-density polyethylene; a fourth polyolefin layer comprising high-density polyethylene; a fifth polyolefin layer comprising high-density polyethylene; a sixth polyolefin layer comprising high-density polyethylene; a seventh polyolefin layer comprising high-density polyethylene; an eighth polyolefin layer comprising high-density polyethylene; a first barrier tie layer; a barrier layer; a second barrier tie layer; a ninth polyolefin layer comprising high-density polyethylene; and a tenth polyolefin layer comprising linear low-density polyethylene.

Other embodiments of the present invention include an oral care packaging comprising a flexible tube having a wall formed of a multi-layer structure comprising at least two polyolefin layers and a barrier layer, the multi-layer structure having a density ranging from about 0.950 g/cm$^3$ to about 0.965 g/cm$^3$.

Other embodiments of the present invention include an oral care packaging comprising a flexible tube having a wall formed of a multi-layer structure comprising at least two polyolefin layers and a barrier layer, the multi-layer structure having a melt flow index ranging from about 0.7 g/10 min to about 1.1 g/10 min.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
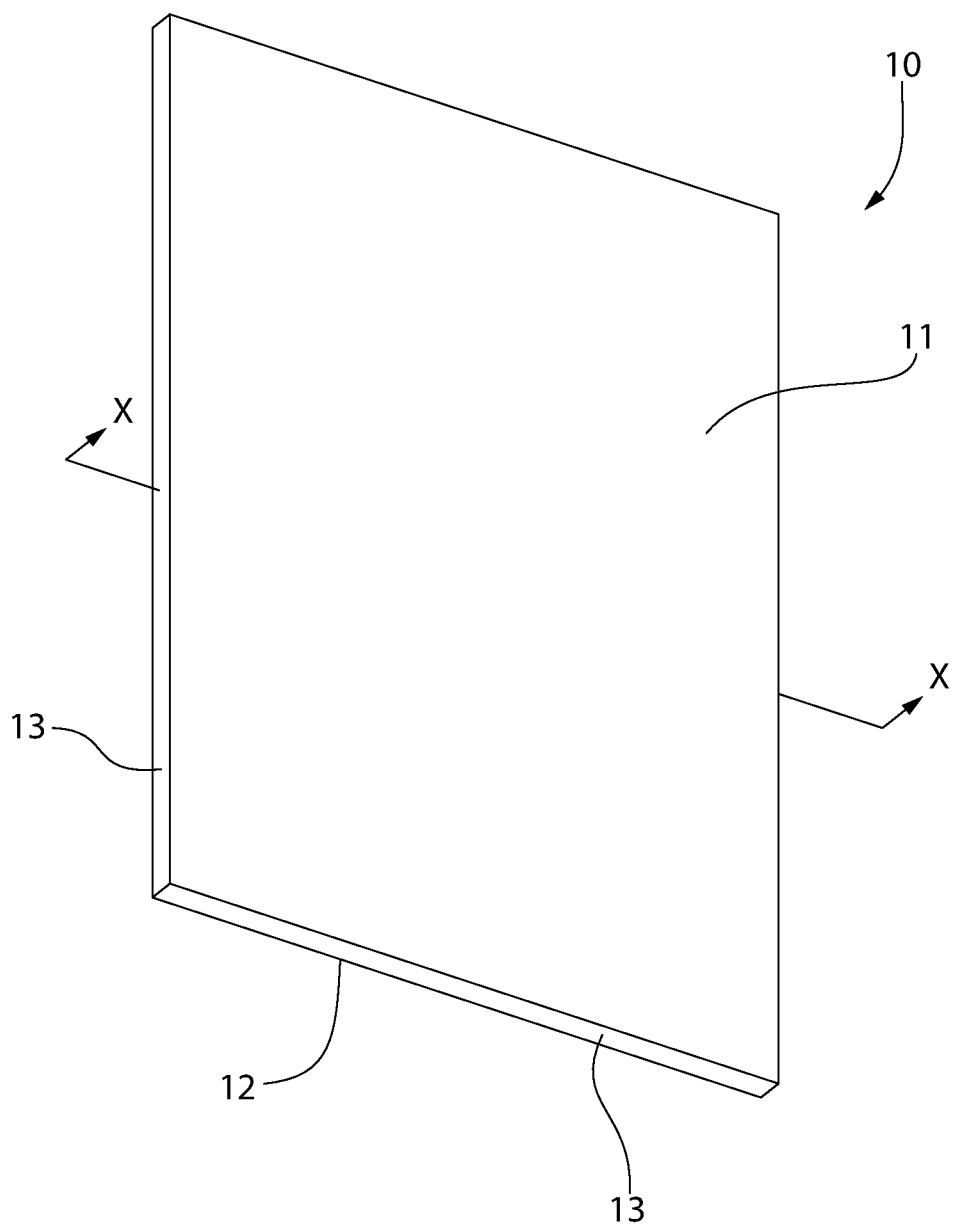
FIG. 1 is a perspective view of a sheet according to the present invention.
Figure 2:
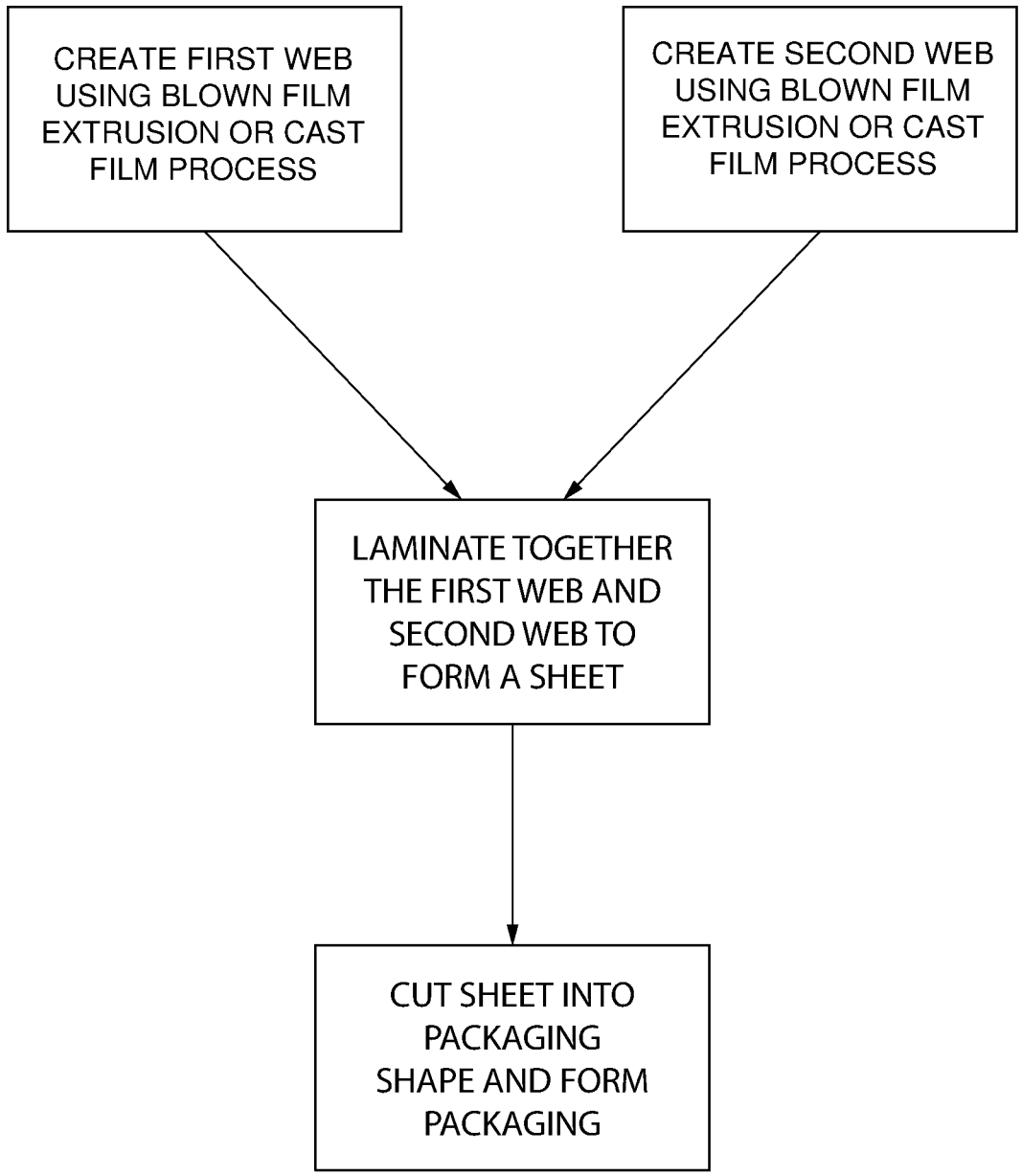
FIG. 2 is a block-diagram of a method of forming the sheet as well as a packaging from the sheet according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Figure 16:
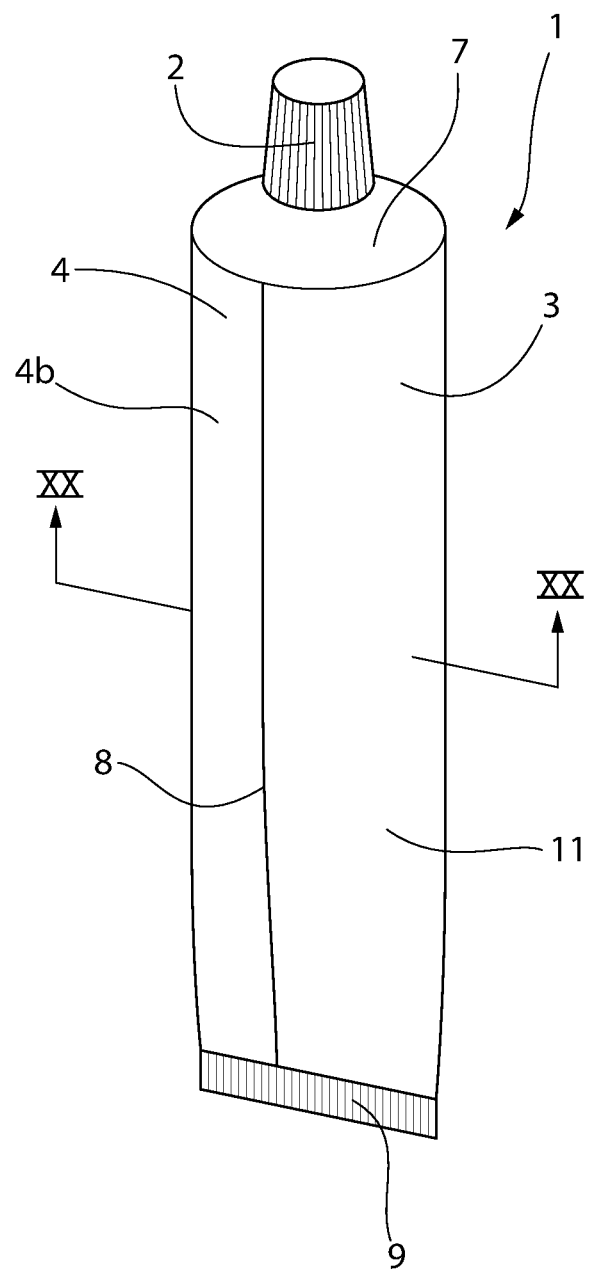
FIG. 16 is an packaging formed from the open-tube of FIG. 15 according to some embodiments of the present invention.
Figure 17:
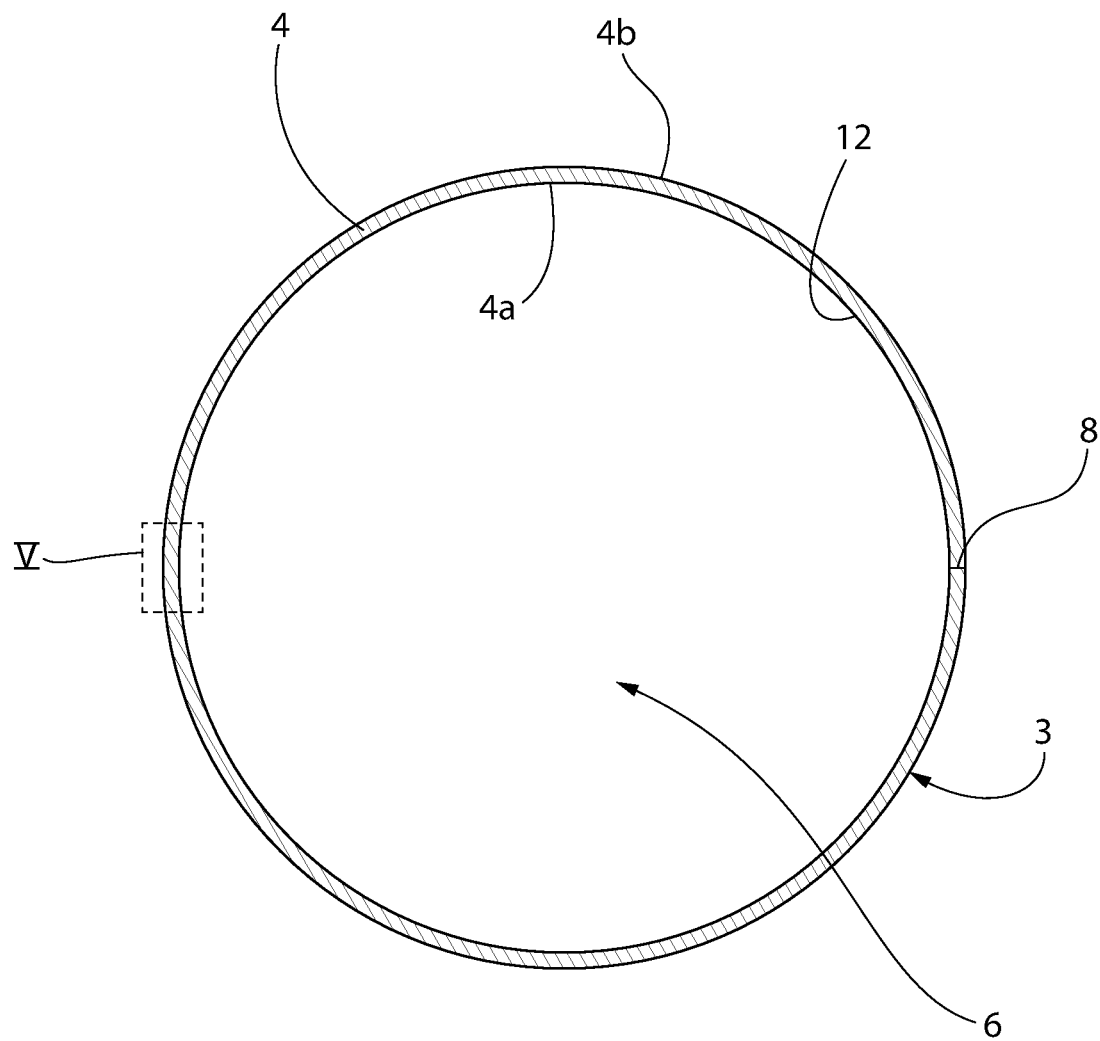
FIG. 17 is a cross-sectional view of the container along lines XX-XX of FIG. 16.

Referring now to FIGS. 1 and 16, the present invention is directed to a sheet 10 and a container 1 (also referred as "packaging") comprising a sleeve 3 that may be formed at least in part from the sheet 10. The sheet 10 of the present invention may be flexible—i.e., capable of being non-permanently deformed without fracture. The sheet 10 of the present invention may be recyclable—i.e., capable of being recycled. As discussed in greater detail herein, the container 1 may be a container suitable for containing an oral care composition—e.g., toothpaste.

The term "flexible" refers to the ability of a material to non-permanently deform under an applied stress, whereby the material returns to its original shape after the applied stress is removed.

Figure 3:
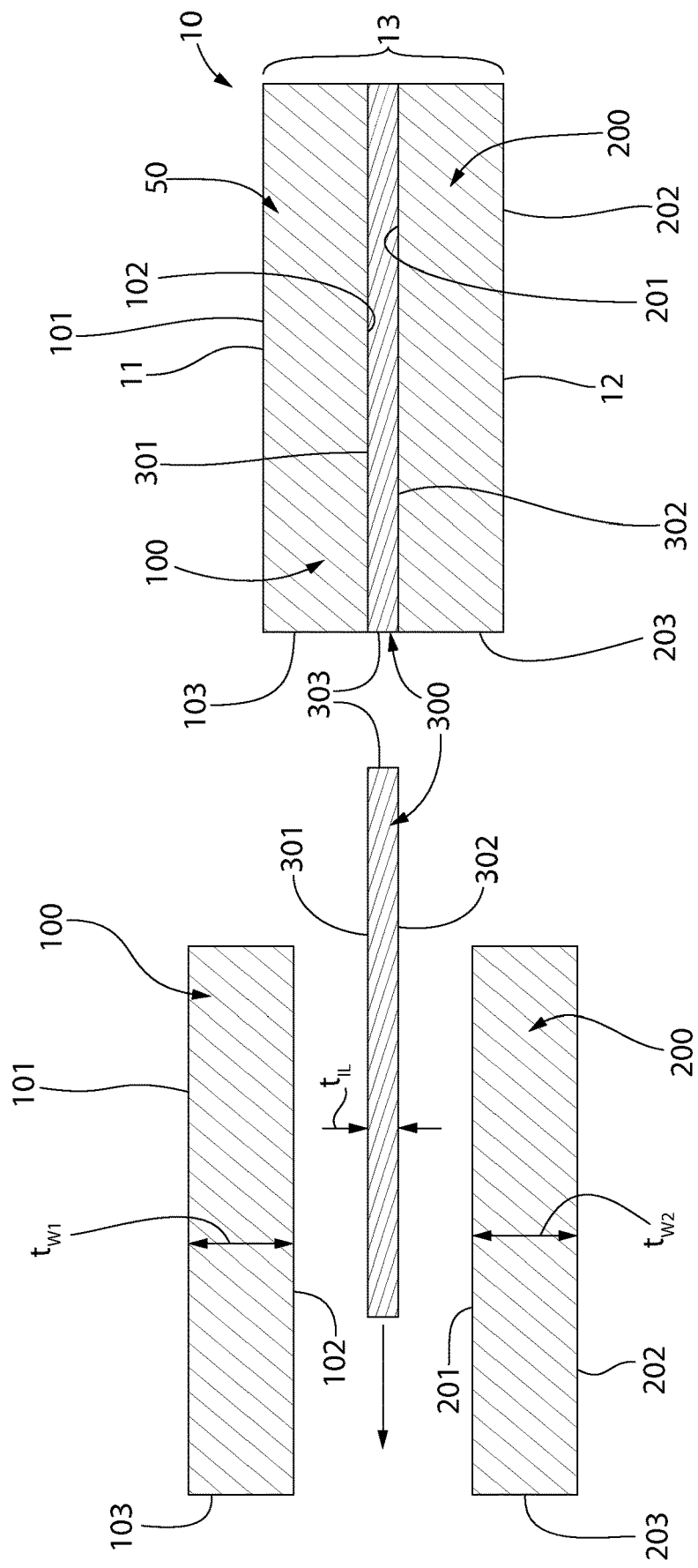
FIG. 3 is a cross-sectional representation of how the sheet of the present invention is formed according to some embodiments of the present invention.

Referring now to FIGS. 1 and 3, the sheet 10 may comprise a first exposed major surface 11 opposite a second exposed major surface 12. The sheet may further comprise an exposed side surface 13 extending between the first and second major exposed surfaces 11, 12. The sheet may have a sheet thickness $t_S$ as measured between the first exposed major surface 11 opposite a second exposed major surface 12—the sheet thickness $t_S$ ranging from about 20 μm to about 550 μm—including all thickness and sub-ranges there-between. In a preferred embodiment, the sheet thickness $t_S$ may range from about 120 μm to about 380 μm—including all thickness and sub-ranges there-between.

Figure 7:
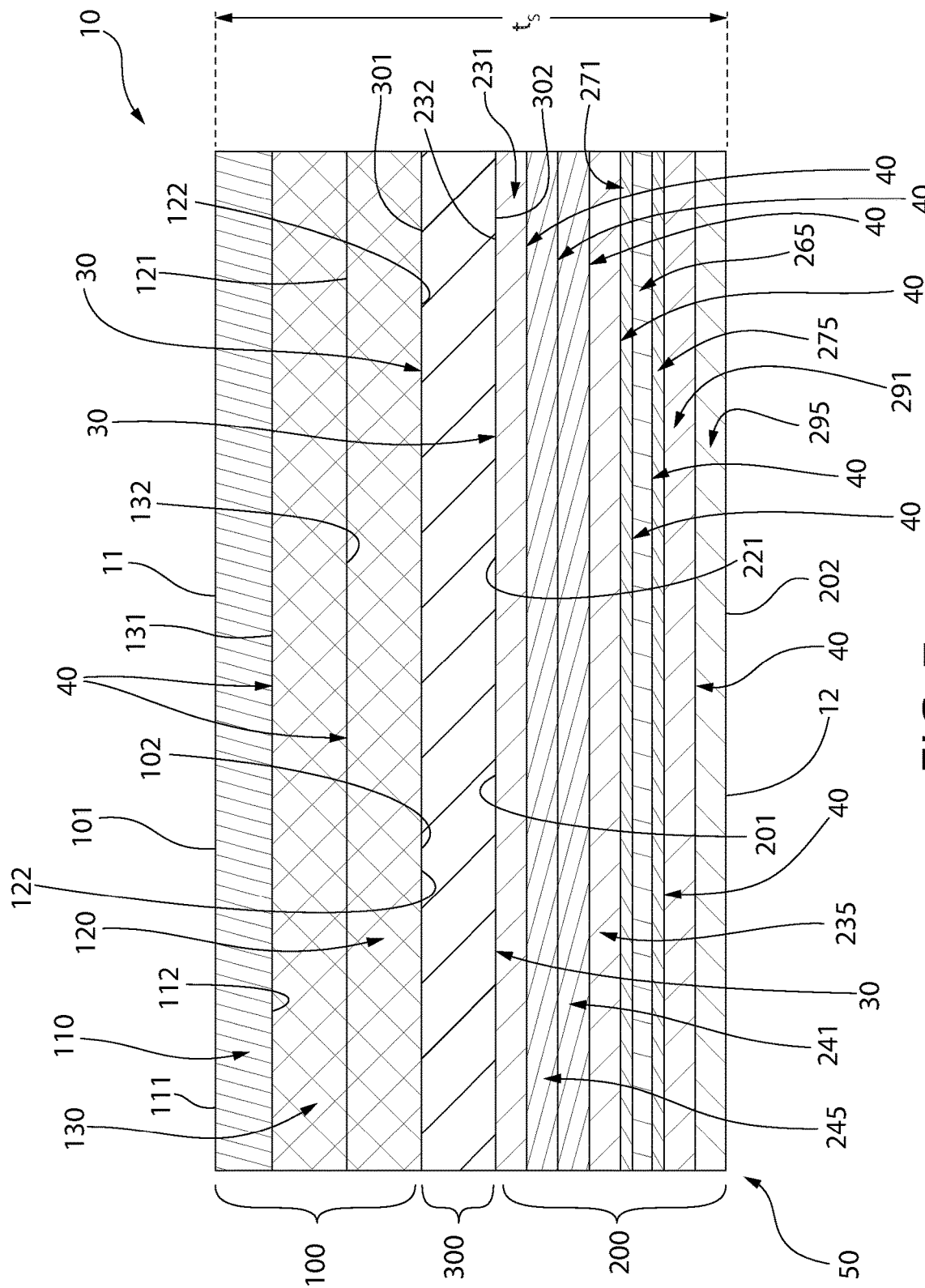
FIG. 7 is a cross-section view of the sheet of FIG. 6 taken along lines X-X of FIG. 1.

Referring now to FIG. 7, the sheet 10 may comprise a multi-layer structure 50 comprising a plurality of layers. As discussed in greater detail herein, each of the layers may be independently formed from a polymeric material. In some embodiments, each of the layers independently may consist essentially of polymeric material. In some embodiments of the present invention, each of the layers independently may consist of polymeric material.

Polymeric material is comprised of macromolecule chains. Within each layer of the multi-layer structure 50 that is formed from a polymeric material, the corresponding macromolecule chains (i.e., polymer chains) may exhibit a specific molecular orientation.

For the purpose of the present application, each layer may exhibit a molecular orientation—which corresponds to the molecular orientation of the polymeric chains contained within the layer. Depending on the molecular orientation for a given layer, the counterbalancing forces of the polymer chains within that given layer may not be at equilibrium, thereby causing that layer to be in a state of internal stress. The internal stress of the given layer may manifest in the given layer deforming (e.g., curling) from a substantially flat state (i.e., the major surfaces of the layer are substantially planar and parallel to each other) to a non-flat state (e.g., curled or wavy configuration) when no external forces are applied to that given layer. Stated otherwise, each layer of the multi-layer structure 50 that is formed of polymeric material may exhibit a stress pattern. The layer's respective change in shape may be the result of the counterbalancing forces of all polymer chains returning to a state of equilibrium.

The internal stress of each layer in the flat state that is caused by the molecular orientation may form a stress pattern having a corresponding stress value. The stress pattern refers to the distribution of forces within each referenced layer and the corresponding stress value is a value assigned to the referenced layer that indicates whether the layer is at equilibrium or not at equilibrium. The stress value is a measure of magnitude of stress—therefore, the stress value is an absolute value (i.e., positive value) irrespective of whether the molecular orientation within each layer produces positive and/or negative when the stress pattern. As an example, a first layer have a first stress value that is zero refers to the internal stress caused by the molecular orientation of the polymer chains within that first layer being at equilibrium; a second layer having a non-zero stress value refers to the internal stress caused by the molecular orientation of the polymer chains within that second layer not being at equilibrium. As an example, a first layer have a first stress value that is a non-zero value and a second layer having a non-zero stress value, whereby the first stress value is greater than the second stress value, refers to the first layer having a greater internal stress caused by the molecular orientation of the polymer chains within the first layer, as compared to the second layer, which has a lower internal stress caused by the molecular orientation of polymer chains within that second layer.

In some embodiments, the stress value of a given layer may be a non-zero value—meaning that the given layer may deform from a flat state to a non-flat state when no external force is applied to that given layer. In other embodiments, the stress value of a given layer may substantially zero. According to the present application, a substantially zero stress value refers to that given layer not deforming from a flat state to a non-flat state in the absence of an external force applied to that given layer.

Each layer of the multi-layer structure 50 of the present invention may have a molecular orientation resulting in a stress value for that respective layer. The stress values of at least two of the plurality of layers may be non-zero values and different from one another. In some embodiments, the stress values of at least three of the plurality of layers may be non-zero values and different from one another. In some embodiments, the stress values of at least four of the plurality of layers may be non-zero values and different from one another.

According to the present invention, it has been discovered that the resulting multi-layer structure 50 may comprise such layers having such non-zero stress values that are different from one another, yet the overall multi-layer structure 50 has a net stress value that is less than the greater stress value for the individual layers within the multi-layer structure 50. Stated otherwise, the multi-layer structure 50 may exhibit a non-zero stress value, yet the net stress value of the multi-layer structure 50 will still be less than the greatest stress value for an individual layer within that multi-layer structure 50—thereby resulting in the multi-layer structure 50 exhibiting less curl as compared the layer having the greatest individual stress value.

Thus, while the stress patterns of each individual layer may be a non-zero value and are different from each other—the summation of all stress patterns may at least partially counterbalance each other, thereby putting the multi-layer structure 50 closer to equilibrium and reducing the amount of deformation (e.g., curling) within the multi-layer structure 50. The result is a multi-layer structure 50 that will deform less and be less likely to transition from a flat state (i.e., non-curled) to a non-flat state (i.e., curled) in the absence of an external force applied to that multi-layer structure 50 even when those individual layers that make up the multi-layer structure 50, when observed individually, may deform from a flat state to a non-flat state in the absence of an external force applied to that given layer.

In some embodiments, it has been discovered that the resulting multi-layer structure 50 may comprise such layers having such non-zero stress values that are different from one another, yet the overall multi-layer structure 50 may have a net stress value that is substantially zero.

The counterbalancing stress patterns of the multi-layer structure 50 of the present invention result in a sheet 10 that may remain substantially flat—even when the layers contained therein may exhibit an internal stress due to different relative molecular orientations. Such discovery provides an advantage as it allows for rapid production of sheet 10 material that is highly suitable for the container 1.

Referring now to FIG. 3, the multi-layer structure 50 of the sheet 10 may comprise a first web 100. The multi-layer structure 50 of the sheet 10 may also comprise a second web 200. The multi-layer structure 50 of the sheet 10 may comprise an intermediate sheet layer 300. The intermediate sheet layer 300 may function as a tie layer for two adjacent layers having non-functionalized polyolefin surfaces.

The first web 100 may be a single layer web 100. In other embodiments, the first web 100 may be a multi-layer web (also referred to as a "first multi-layer web"). The first web 100 may have a first major surface 101 opposite a second major surface 102 and a side surface 103 extending therebetween. The first web 100 may have a first thickness $t_{W1}$ (also referred to as a "first web thickness") as measured between the first and second major surfaces 101, 102 of the first web 100.

The second web 200 may be a multi-layer web (also referred to as a "second multi-layer web"). The second web 200 may have a first major surface 201 opposite a second major surface 202 and a side surface 203 extending therebetween. The second web 200 may have a second thickness $t_{W2}$ (also referred to as a "second web thickness") as measured between the first and second major surfaces 201, 202 of the second web 200.

In some embodiments, the first web 100 may be joined to the second web 200. In some embodiments, the first web 100 may be joined directly to the second web 200. The first major surface 201 of the second web 200 may face the second major surface 102 of the first web 100.

In some embodiments, the intermediate sheet layer 300 may be located between the first web 100 and the second web 200. The intermediate sheet layer 300 may be a single layer. In other embodiments, the intermediate sheet layer 300 may comprise a plurality of layers. The intermediate sheet layer 300 may have a first major surface 301 opposite a second major surface 302 and a side surface 303 extending there-between.

In some embodiments, the first web 100 may be joined to the intermediate sheet layer 300 and the intermediate sheet layer 300 may be joined to the second web 200. In some embodiments, the first web 100 may be joined directly to the intermediate sheet layer 300 and the intermediate sheet layer 300 may be joined directly to the second web 200.

The first major surface 201 of the second web 200 may face the second major surface 302 of the intermediate sheet layer 300, and the first major surface 301 of the intermediate sheet layer 301 may face the second major surface 102 of the first web 100. The first major surface 201 of the second web 200 may directly contact the second major surface 302 of the intermediate sheet layer 300, and the first major surface 301 of the intermediate sheet layer 301 may directly contact the second major surface 102 of the first web 100.

The intermediate sheet layer 300 may have an intermediate layer thickness $t_{IL}$ as measured between the first and second major surfaces 301, 302 of the intermediate sheet layer 300.

The first web thickness $t_{W1}$ may be greater than the second web thickness $t_{W2}$. A ratio between the first web thickness $t_{W1}$ and the second web thickness $t_{W2}$ may range from about 1.05:1 to about 1.60:1—including all ratios and sub-ranges there-between. A ratio between the first web thickness $t_{W1}$ and the second web thickness $t_{W2}$ may range from about 1.1:1 to about 1.4:1—including all ratios and sub-ranges there-between.

The first web thickness $t_{W1}$ may be greater than the intermediate layer thickness $t_{IL}$. A ratio between the first web thickness $t_{W1}$ and the intermediate layer thickness $t_{IL}$ may range from about 3.5:1 to about 20.0:1—including all ratios and sub-ranges there-between. In a preferred embodiment, a ratio between the first web thickness $t_{W1}$ and the intermediate layer thickness $t_{IL}$ may range from about 4.0:1 to about 6.0:1—including all ratios and sub-ranges there-between.

The second web thickness $t_{W2}$ may be greater than the intermediate layer thickness $t_{IL}$. A ratio between the second web thickness $t_{W2}$ and the intermediate layer thickness $t_{IL}$ may range from about 3.0:1 to about 5.5:1—including all ratios and sub-ranges there-between. In a preferred embodiment, a ratio between the second web thickness $t_{W2}$ and the intermediate layer thickness $t_{IL}$ may be about 4.2:1.

The first web thickness $t_{W1}$ of the first web 100 may range from about 90 μm to about 250 μm—including all thickness and sub-ranges there-between. In a preferred embodiment, the first web thickness $t_{W1}$ of the first web 100 may range from about 105 μm to about 200 μm—including all thickness and sub-ranges there-between. In a preferred embodiment, the first web thickness $t_{W1}$ of the first web 100 may be about 120 μm.

The second web thickness $t_{W2}$ of the second web 200 may range from about 60 μm to about 200 μm—including all thickness and sub-ranges there-between. In a preferred embodiment, the second web thickness $t_{W2}$ of the second web 200 may range from about 30 μm to about 150 μm—including all thickness and sub-ranges there-between. In a preferred embodiment, the second web thickness $t_{W2}$ of the second web 200 may be about 105 μm.

The intermediate layer thickness $t_{IL}$ of the intermediate sheet layer 300 may range from about 10 μm to about 50 μm—including all thickness and sub-ranges there-between. In a preferred embodiment, the intermediate layer thickness $t_{IL}$ of the intermediate sheet layer 300 may be about 25 μm.

The first web 100 may have a first overall density ranging from about 0.94 g/cm$^3$ to about 0.99 g/cm$^3$—including all densities and sub-ranges there-between. The second web 200 may have a second overall density ranging from about 0.94 g/cm$^3$ to about 0.99 g/cm$^3$—including all densities and sub-ranges there-between. The intermediate sheet layer 300 may have a third overall density ranging from about 0.88 g/cm$^3$ to about 0.94 g/cm$^3$—including all densities and sub-ranges there-between. The overall multi-layer structure may have an overall density ranging from about 0.95 g/cm$^3$ to about 0.965 g/cm$^3$—including all densities and sub-ranges there-between.

The first overall density of the first web 100 may be substantially equal to the second overall density of the second web 100. The third overall density of the intermediate sheet layer 300 may be different than each of the first overall density of the first web 100 and the second overall density of the second web 100.

Second Web

Figure 4:
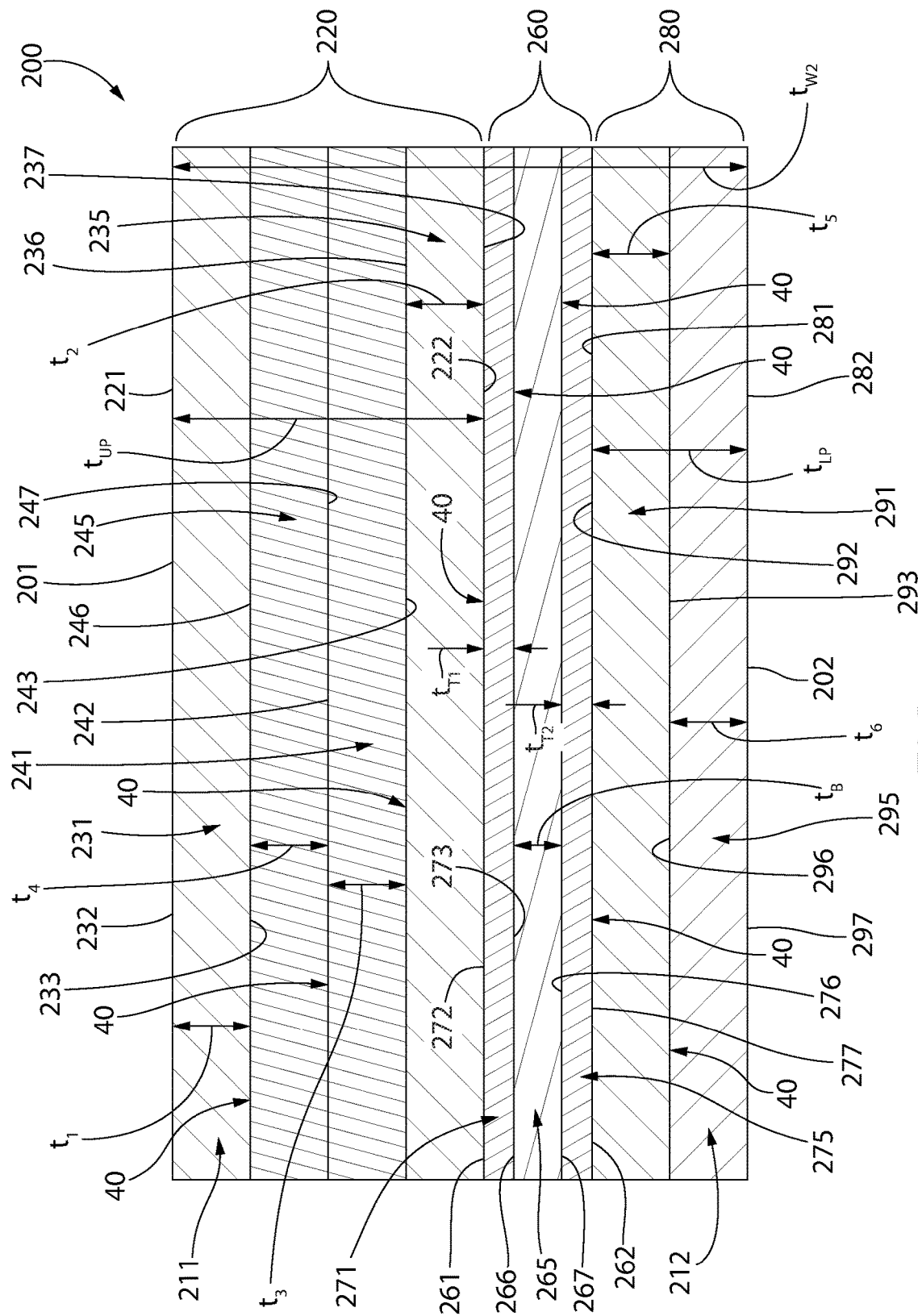
FIG. 4 is a cross-sectional view of a web that forms part of the sheet of the present invention.

The second web 200 of the sheet 10 may be a multi-layer web (also referred to as a "second multi-layer web"). Referring now to FIG. 4, the second web 200 may comprise an uppermost layer 211 opposite a lowermost layer 212. The second web 200 may comprise a upper portion 220, a lower portion 280, and a barrier portion 260. The upper portion 220 of the second web 200 may comprise the uppermost layer 211 of the second web 200 and the lower portion 280 of the second web 200 may comprise the lowermost layer 212 of the second web 200.

The upper portion 220 of the second web 200 may comprise a plurality of layers. In other embodiments, the upper portion 220 of the second web 200 may comprise a single layer (not shown in FIG. 4). The upper portion 220 of the second web 200 may comprise an uppermost surface 221 that is opposite a lowermost surface 222. The uppermost surface 221 of the upper portion 220 of the second web 200 may form the first major surface 201 of the second web 200. Stated otherwise, the first major surface 201 of the second web 200 may comprise the uppermost surface 221 of the upper portion 220 of the second web 200.

The upper portion 220 of the second web 200 may have a thickness $t_{UP}$ as measured by the distance between the uppermost surface 221 of the upper portion 220 and the lowermost surface 222 of the upper portion 220—whereby the thickness $t_{UP}$ of the upper portion 220 ranges from about 40 μm to about 150 μm—including all thickness and sub-ranges there-between.

The upper portion 220 of the second web 200 may comprise a top layer 231. The top layer 231 of the upper portion 220 of the second web 200 may have a first major surface 232 opposite a second major surface 233. The top layer 231 of the upper portion 220 of the second web 200 may have a first thickness $t_1$ as measured by the distance between the first major surface 232 and the second major surface 233 of the top layer 231 of the upper portion 220 of the second web 200. The first major surface 232 of the top layer 231 of the upper portion 220 of the second web 200 may form the first major surface 201 of the second web 200. Stated otherwise, the first major surface 201 of the second web 200 may comprise the first major surface 232 of the top layer 231 of the upper portion 220 of the second web 200.

The first thickness $t_1$ of the top layer 231 may range from about 5 µm to about 30 µm—including all thicknesses and sub-ranges there-between. In some embodiments, the first thickness $t_1$ of the top layer 231 may range from about 10 µm to about 20 µm—including all thicknesses and sub-ranges there-between. In some embodiments, the first thickness $t_1$ of the top layer 231 may range from about 14 µm to about 16 µm—including all thicknesses and sub-ranges there-between. In some embodiments, the first thickness $t_1$ of the top layer 231 may be about 15 µm.

The top layer 231 of the upper portion 220 of the second web 200 may be formed from a polymeric material. The top layer 231 of the upper portion 220 of the second web 200 consists essentially of the polymeric material. The top layer 231 of the upper portion 220 of the second web 200 may consist of the polymeric material. The polymeric material may be high-density polyethylene ("HDPE"). The top layer 231 of the upper portion 220 of the second web 200 may consist essentially of HDPE. The top layer 231 of the upper portion 220 of the second web 200 may consist of HDPE.

The polymeric material that forms the top layer 231 of the upper portion 220 of the second web 200 may have a density ranging from about 0.94 g/cm³ to about 1.0 g/cm³—including all densities and sub-ranges there-between. In a preferred embodiment, the polymeric material that forms the top layer 231 of the upper portion 220 of the second web 200 may have a density ranging from about 0.93 g/cm³ to about 0.97 g/cm³—including all densities and sub-ranges there-between. In a preferred embodiment, the polymeric material that forms the top layer 231 of the upper portion 220 of the second web 200 may have a density ranging from about 0.94 g/cm³ to about 0.96 g/cm³—including all densities and sub-ranges there-between. In a preferred embodiment, the density of the polymeric material that forms the top layer 231 of the upper portion 220 of the second web 200 may be about 0.95 g/cm³.

The polymeric material that forms the top layer 231 of the upper portion 220 of the second web 200 may have a melt index ranging from about 0.2 g/10 min to about 3.0 g/10 min—including all melt indexes and sub-ranges there-between. In a preferred embodiment, the polymeric material that forms the top layer 231 of the upper portion 220 of the second web 200 may have a melt index ranging from about 1.0 g/10 min to about 1.2 g/10 min—including all melt indexes and sub-ranges there-between. In a preferred embodiment, the polymeric material that forms the top layer 231 of the upper portion 220 of the second web 200 may have a melt index that is about 1.1 g/10 min.

The first major surface 232 of the top layer 231 may form the uppermost surface 221 of the upper portion 220 of the second web 200. Stated otherwise, the uppermost surface 221 of the upper portion 220 of the second web 200 may comprise the first major surface 232 of the top layer 231.

The upper portion 220 of the second web 200 may comprise a bottom layer 235. The bottom layer 235 of the upper portion 220 of the second web 200 may have a first major surface 236 opposite a second major surface 237. The bottom layer 235 of the upper portion 220 of the second web 200 may have a second thickness $t_1$ as measured by the distance between the first major surface 236 and the second major surface 237 of the bottom layer 235 of the upper portion 220 of the second web 200.

The second thickness $t_2$ of the bottom layer 235 may range from about 5 µm to about 30 µm—including all thicknesses and sub-ranges there-between. In some embodiments, the second thickness $t_2$ of the bottom layer 235 may range from about 10 µm to about 20 µm—including all thicknesses and sub-ranges there-between. In some embodiments, the second thickness $t_2$ of the bottom layer 235 may range from about 14 µm to about 16 µm—including all thicknesses and sub-ranges there-between. In some embodiments, the second thickness $t_2$ of the bottom layer 235 may be about 15 µm.

The bottom layer 235 of the upper portion 220 of the second web 200 may be formed from a polymeric material. The bottom layer 235 of the upper portion 220 of the second web 200 consist essentially of the polymeric material. The bottom layer 235 of the upper portion 220 of the second web 200 may consist of the polymeric material. The polymeric material may be high-density polyethylene ("HDPE"). The bottom layer 235 of the upper portion 220 of the second web 200 may consist essentially of HDPE. The bottom layer 235 of the upper portion 220 of the second web 200 may consist of HDPE.

The polymeric material that forms the bottom layer 235 of the upper portion 220 of the second web 200 may have a density ranging from about 0.94 g/cm³ to about 1.0 g/cm³—including all densities and sub-ranges there-between. In a preferred embodiment, the polymeric material that forms the bottom layer 235 of the upper portion 220 of the second web 200 may have a density ranging from about 0.95 g/cm³ to about 0.98 g/cm³—including all densities and sub-ranges there-between. In a preferred embodiment, the polymeric material that forms the bottom layer 235 of the upper portion 220 of the second web 200 may have a density ranging from about 0.96 g/cm³ to about 0.97 g/cm³—including all densities and sub-ranges there-between. In a preferred embodiment, the polymeric material that forms the bottom layer 235 of the upper portion 220 of the second web 200 may have a density of about 0.965 g/cm³.

The polymeric material that forms the bottom layer 235 of the upper portion 220 of the second web 200 may have a melt index ranging from about 0.5 g/10 min to about 1.0 g/10 min—including all melt indexes and sub-ranges there-between. In a preferred embodiment, the polymeric material that forms the bottom layer 235 of the upper portion 220 of the second web 200 may have a melt index ranging from about 0.6 g/10 min to about 0.9 g/10 min—including all melt indexes and sub-ranges there-between. In a preferred embodiment, the polymeric material that forms the bottom layer 235 of the upper portion 220 of the second web 200 may have a melt index that is about 0.7 g/10 min.

The second major surface 237 of the bottom layer 235 may form the lowermost surface 222 of the upper portion 220 of the second web 200. Stated otherwise, the lowermost surface 222 of the upper portion 220 of the second web 200 may comprise the second major surface 237 of the bottom layer 235.

The upper portion 220 of the second web 200 may comprise a first upper intermediate layer 241. The first upper intermediate layer 241 of the upper portion 220 of the second web 200 may have a first major surface 242 opposite a second major surface 243. The first upper intermediate layer 241 of the upper portion 220 of the second web 200 may have a third thickness $t_3$ as measured by the distance between the first major surface 242 and the second major surface 243 of the first upper intermediate layer 241 of the upper portion 220 of the second web 200.

The third thickness $t_3$ of the first upper intermediate layer 241 may range from about 5 µm to about 30 µm—including all thicknesses and sub-ranges there-between. In some embodiments, the third thickness $t_3$ of the first upper intermediate layer 241 may range from about 10 µm to about 20 µm—including all thicknesses and sub-ranges there-between. In some embodiments, the third thickness $t_3$ of the first upper intermediate layer 241 may range from about 14 µm to about 16 µm—including all thicknesses and sub-ranges there-between. In some embodiments, the third thickness $t_3$ of the first upper intermediate layer 241 may be about 15 µm.

The first upper intermediate layer 241 may be directly adjacent to the bottom layer 235 of the upper portion 220 of the second web 200. In such embodiments the second major surface 243 of the first upper intermediate layer 241 may directly contact the first major surface 236 of the bottom layer 235 of the upper portion 220 of the second web 200. The first upper intermediate layer 241 may be located beneath the top layer 231 of the upper portion 220 of the second web 200. The first upper intermediate layer 241 may be located between the top layer 231 and the bottom layer 235 of the upper portion 220 of the second web 200.

The upper portion 220 of the second web 200 may comprise a second upper intermediate layer 245. The second upper intermediate layer 245 of the upper portion 220 of the second web 200 may have a first major surface 246 opposite a second major surface 247. The second upper intermediate layer 245 of the upper portion 220 of the second web 200 may have a fourth thickness $t_4$ as measured by the distance between the first major surface 246 and the second major surface 247 of the second upper intermediate layer 245 of the upper portion 220 of the second web 200.

The fourth thickness $t_4$ of the second upper intermediate layer 245 may range from about 5 µm to about 30 µm—including all thicknesses and sub-ranges there-between. In some embodiments, the fourth thickness $t_4$ of the second upper intermediate layer 245 may range from about 10 µm to about 20 µm—including all thicknesses and sub-ranges there-between. In some embodiments, the fourth thickness $t_4$ of the second upper intermediate layer 245 may range from about 14 µm to about 16 µm—including all thicknesses and sub-ranges there-between. In some embodiments, the fourth thickness $t_4$ of the second upper intermediate layer 245 may be about 15 µm.

The second upper intermediate layer 241 may be directly adjacent to the top layer 231 of the upper portion 220 of the second web 200. In such embodiments the first major surface 246 of the second upper intermediate layer 245 may directly contact the second major surface 233 of the top layer 231 of the upper portion 220 of the second web 200. The second upper intermediate layer 245 may be located above the bottom layer 235 of the upper portion 220 of the second web 200. The second upper intermediate layer 245 may be located between the top layer 231 and the bottom layer 235 of the upper portion 220 of the second web 200.

The first upper intermediate layer 241 and the second upper intermediate layer 245 may be in direct contact with each other. The first major surface 242 of the first upper intermediate layer 241 may be in direct contact with the second major surface 247 of the second upper intermediate layer 245.

The upper portion 220 of the second web 200 may consist of the top layer 231, the first and second intermediate layers 241, 245, and the bottom layer 235 such that uppermost surface 221 of the upper portion 220 of the second web 200 is formed by the first major surface 232 of the top layer 231, the second major surface 233 of the top layer 231 is in direct contact with the first major surface 246 of the second upper intermediate layer 245, the second major surface 247 of the second upper intermediate layer 245 is in direct contact with the first major surface 242 of the first upper intermediate layer 241, the second major surface 243 of the first upper intermediate layer 241 is in direct contact with the first major surface 236 of the bottom layer 236, and the lowermost surface 222 of the upper portion 220 of the second web 200 is formed by the second major surface 237 of the bottom layer 235.

Each of the first and second upper intermediate layers 241, 245 of the upper portion 220 of the second web 200 may be formed from a polymeric material. Each of the first and second upper intermediate layers 241, 245 of the upper portion 220 of the second web 200 may consist essentially of the polymeric material. Each of the first and second upper intermediate layers 241, 245 of the upper portion 220 of the second web 200 may consist of the polymeric material. The polymeric material may be high-density polyethylene ("HDPE"). Each of the first and second upper intermediate layers 241, 245 of the upper portion 220 of the second web 200 may consist essentially of HDPE. Each of the first and second upper intermediate layers 241, 245 of the upper portion 220 of the second web 200 may consist of HDPE.

In other embodiments, each of the first and second upper intermediate layers 241, 245 may be formed from the polymeric material and a pigment. The pigment may be in the form of a particle. Each of the first and second upper intermediate layers 241, 245 may independently consist essentially of the polymeric material and the pigment. Each of the first and second upper intermediate layers 241, 245 may independently consist of the polymeric material and the pigment. The pigment may be titanium dioxide. For each of the first and second upper intermediate layers 241, 245, the polymeric material may consist essentially of HDPE and the pigment may consist essentially of titanium dioxide. Each of the first and second upper intermediate layers 241, 245 may consist of HDPE and titanium dioxide particles.

The pigment may have a particle size ranging from about 100 nm to about 400 nm—including all sizes and sub-ranges there-between.

The polymeric material may independently be present in each of the first and second upper intermediate layers 241, 245 in an amount ranging from about 75 wt. % to about 95 wt. % based on the total weight of each respective first and second upper intermediate layers 241, 245—including all weight percentages and sub-ranges there-between—and the pigment may independently may be present in each respective first and second upper intermediate layers 241, 245 in an amount ranging from about 5 wt. % to about 25 wt. % based on the total weight of each respective first and second upper intermediate layers 241, 245—including all weight percentages and sub-ranges there-between—whereby the total amount of polymeric material and pigment in the top layer 110 total to 100 wt. %.

In a preferred embodiment, the polymeric material may independently be present in each of the first and second upper intermediate layers 241, 245 in an amount ranging from about 80 wt. % to about 90 wt. % based on the total weight of each respective first and second upper intermediate layers 241, 245—including all weight percentages and sub-ranges there-between—and the pigment may independently may be present in each respective first and second upper intermediate layers 241, 245 in an amount ranging from about 10 wt. % to about 20 wt. % based on the total weight of each respective first and second upper intermediate layers 241, 245—including all weight percentages and sub-ranges there-between—whereby the total amount of polymeric material and pigment in the top layer 110 total to 100 wt. %.

In a non-limiting example, the polymeric material may independently be present in each of the first and second upper intermediate layers 241, 245 in an amount of about 85 wt. % based on the total weight of each respective first and second upper intermediate layers 241, 245, and the pigment may independently may be present in each respective first and second upper intermediate layers 241, 245 in an amount of about 15 wt. % based on the total weight of each respective first and second upper intermediate layers 241, 245, whereby the total amount of polymeric material and pigment in the top layer 110 total to 100 wt. %.

The polymeric material that may form each of the first and second upper intermediate layers 241, 245 of the upper portion 220 of the second web 200 may have a density ranging from about 0.94 g/cm$^3$ to about 1.0 g/cm$^3$—including all densities and sub-ranges there-between. In a preferred embodiment, the polymeric material that may form each of the first and second upper intermediate layers 241, 245 of the upper portion 220 of the second web 200 may have a density ranging from about 0.95 g/cm$^3$ to about 0.98 g/cm$^3$—including all densities and sub-ranges there-between. In a preferred embodiment, the polymeric material that may form each of the first and second upper intermediate layers 241, 245 of the upper portion 220 of the second web 200 may have a density ranging from about 0.96 g/cm$^3$ to about 0.97 g/cm$^3$—including all densities and sub-ranges there-between. In a preferred embodiment, the polymeric material that may form each of the first and second upper intermediate layers 241, 245 of the upper portion 220 of the second web 200 may have a density of about 0.965 g/cm$^3$.

The polymeric material that may form each of the first and second upper intermediate layers 241, 245 of the upper portion 220 of the second web 200 may have a melt index ranging from about 0.2 g/10 min to about 3.0 g/10 min—including all melt indexes and sub-ranges there-between. In a preferred embodiment, the polymeric material that may form each of the first and second upper intermediate layers 241, 245 of the upper portion 220 of the second web 200 may have a melt index ranging from about 0.6 g/10 min to about 2.0 g/10 min—including all melt indexes and sub-ranges there-between. In a preferred embodiment, the polymeric material that may form each of the first and second upper intermediate layers 241, 245 of the upper portion 220 of the second web 200 may have a melt index that is about 0.7 g/10 min.

The lower portion 280 of the second web 200 may comprise a plurality of layers. In other embodiments, the lower portion 280 of the second web 200 may comprise a single layer (not shown in FIG. 4). The lower portion 280 of the second web 200 may comprise an uppermost surface 281 that is opposite a lowermost surface 282. The lowermost surface 282 of the lower portion 280 of the second web 200 may form the second major surface 202 of the second web 200. Stated otherwise, the second major surface 202 of the second web 200 may comprise the lowermost surface 282 of the lower portion 280 of the second web 200.

The lower portion 280 of the second web 200 may have a thickness $t_{LP}$ as measured by the distance between the uppermost surface 281 of the lower portion 280 and the lowermost surface 282 of the lower portion 280—whereby the thickness $t_{LP}$ of the lower portion 280 ranges from about 20 μm to about 60 μm—including all thickness and sub-ranges there-between.

The lower portion 280 of the second web 200 may comprise a top layer 291. The top layer 291 of the lower portion 280 of the second web 200 may have a first major surface 292 opposite a second major surface 293. The top layer 291 of the lower portion 280 of the second web 200 may have a fifth thickness $t_5$ as measured by the distance between the first major surface 292 and the second major surface 293 of the top layer 291 of the lower portion 280 of the second web 200.

The fifth thickness $t_5$ of the top layer 291 of the lower portion 280 of the second web 200 may range from about 5 μm to about 30 μm—including all thicknesses and sub-ranges there-between. In some embodiments, the fifth thickness $t_5$ of the top layer 291 of the lower portion 280 of the second web 200 may range from about 10 μm to about 20 μm—including all thicknesses and sub-ranges there-between. In some embodiments, the fifth thickness $t_5$ of the top layer 291 of the lower portion 280 of the second web 200 may range from about 14 μm to about 16 μm—including all thicknesses and sub-ranges there-between. In some embodiments, the fifth thickness $t_5$ of the top layer 291 of the lower portion 280 of the second web 200 may be about 15 μm.

The top layer 291 of the of the lower portion 280 of the second web 200 may be formed from a polymeric material. The top layer 291 of the lower portion 280 of the second web 200 may consist essentially of the polymeric material. The top layer 291 of the lower portion 280 of the second web 200 may consist of the polymeric material. The polymeric material may be high-density polyethylene ("HDPE"). The top layer 291 of the lower portion 280 of the second web 200 may consist essentially of HDPE. The top layer 291 of the lower portion 280 of the second web 200 may consist of HDPE.

The polymeric material that forms the top layer 291 of the lower portion 280 of the second web 200 may have a density ranging from about 0.94 g/cm$^3$ to about 1.0 g/cm$^3$—including all densities and sub-ranges there-between. In a preferred embodiment, the polymeric material that forms the top layer 291 of the lower portion 280 of the second web 200 may have a density ranging from about 0.95 g/cm$^3$ to about 0.97 g/cm$^3$—including all densities and sub-ranges there-between. In a preferred embodiment, the polymeric material that forms the top layer 291 of the lower portion 280 of the second web 200 may have a density ranging from about 0.94 g/cm$^3$ to about 0.96 g/cm$^3$—including all densities and sub-ranges there-between. In a preferred embodiment, the density of the polymeric material that forms the top layer 281 of the lower portion 280 of the second web 200 may be about 0.95 g/cm$^3$.

The polymeric material that forms the top layer 291 of the lower portion 280 of the second web 200 may have a melt index ranging from about 0.2 g/10 min to about 3.0 g/10 min—including all melt indexes and sub-ranges there-between. In a preferred embodiment, the polymeric material that forms the top layer 291 of the lower portion 280 of the second web 200 may have a melt index ranging from about 1.0 g/10 min to about 2.0 g/10 min—including all melt indexes and sub-ranges there-between. In a preferred embodiment, the polymeric material that forms the top layer 291 of the lower portion 280 of the second web 200 may have a melt index that is about 1.1 g/10 min.

The first major surface 292 of the top layer 291 of the lower portion 280 may form the uppermost surface 281 of the lower portion 280 of the second web 200. Stated otherwise, the uppermost surface 281 of the lower portion 280 of the second web 200 may comprise the first major surface 292 of the top layer 291 of lower portion 280 of the second web 200.

The lower portion 280 of the second web 200 may comprise a bottom layer 295. The bottom layer 295 of the lower portion 280 of the second web 200 may have a first major surface 296 opposite a second major surface 297. The bottom layer 295 of the lower portion 280 of the second web 200 may have a sixth thickness $t_6$ as measured by the distance between the first major surface 296 and the second major surface 297 of the bottom layer 295 of the lower portion 280 of the second web 200.

The second major surface 297 of the bottom layer 295 of the bottom portion 280 of the second web 200 may form the second major surface 202 of the second web 200. Stated otherwise, the second major surface 202 of the second web 200 may comprise the second major surface 297 of the bottom layer 295 of the bottom portion 280 of the second web 200.

The sixth thickness $t_6$ of the bottom layer 295 of the lower portion 280 of the second web 200 may range from about 10 µm to about 100 µm—including all thicknesses and sub-ranges there-between. In some embodiments, the sixth thickness $t_6$ of the bottom layer 295 of the lower portion 280 of the second web 200 may range from about 15 µm to about 50 µm—including all thicknesses and sub-ranges there-between. In some embodiments, the sixth thickness $t_6$ of the bottom layer 295 of the lower portion 280 of the second web 200 may range from about 20 µm to about 30 µm—including all thicknesses and sub-ranges there-between. In some embodiments, the sixth thickness $t_6$ of the bottom layer 295 of the lower portion 280 of the second web 200 may be about 25 µm.

The bottom layer 295 of the lower portion 280 of the second web 200 may be formed from a polymeric material. The bottom layer 295 of the lower portion 280 of the second web 200 consist essentially of the polymeric material. The bottom layer 295 of the lower portion 280 of the second web 200 may consist of the polymeric material. The polymeric material may be low density polyethylene ("LDPE"), linear low-density polyethylene ("LLDPE") and/or combinations thereof. The bottom layer 295 of the lower portion 280 of the second web 200 may consist essentially of LLDPE, LDPE, and/or combinations thereof. The bottom layer 295 of the lower portion 280 of the second web 200 may consist of LLDPE, LLPE, and combinations thereof.

The polymeric material that forms the bottom layer 295 of the lower portion 280 of the second web 200 may have a density ranging from about 0.89 g/cm³ to about 0.96 g/cm³—including all densities and sub-ranges there-between. In a preferred embodiment, the polymeric material that forms the bottom layer 295 of the lower portion 280 of the second web 200 may have a density ranging from about 0.90 g/cm³ to about 0.95 g/cm³—including all densities and sub-ranges there-between. In a preferred embodiment, the polymeric material that forms the bottom layer 295 of the lower portion 280 of the second web 200 may have a density ranging from about 0.91 g/cm³ to about 0.94 g/cm³—including all densities and sub-ranges there-between. In a preferred embodiment, the polymeric material that forms the bottom layer 295 of the lower portion 280 of the second web 200 may have a density of about 0.935 g/cm³.

The polymeric material that forms the bottom layer 295 of the lower portion 280 of the second web 200 may have a melt index ranging from about 0.1 g/10 min to about 3.0 g/10 min—including all melt indexes and sub-ranges there-between. In a preferred embodiment, the polymeric material that forms the bottom layer 295 of the lower portion 280 of the second web 200 may have a melt index ranging from about 0.2 g/10 min to about 1.5 g/10 min—including all melt indexes and sub-ranges there-between. In a preferred embodiment, the polymeric material that forms the bottom layer 295 of the lower portion 280 of the second web 200 may have a melt index ranging from about 0.3 g/10 min to about 1.0 g/10 min—including all melt indexes and sub-ranges there-between. In a preferred embodiment, the polymeric material that forms the bottom layer 295 of the lower portion 280 of the second web 200 may have a melt index that is about 0.5 g/10 min.

The second major surface 237 of the bottom layer 235 may form the lowermost surface 222 of the upper portion 220 of the second web 200. Stated otherwise, the lowermost surface 222 of the upper portion 220 of the second web 200 may comprise the second major surface 237 of the bottom layer 235.

The barrier portion 260 of the sheet 10 may be located between the upper portion 220 and the lower portion 280. The barrier portion 260 comprises an uppermost surface 261 opposite a lowermost surface 262. The uppermost surface 261 of the barrier portion 260 may be in direct contact with the lowermost surface 222 of the upper portion 220 of the second web 200. The lowermost surface 262 of the barrier portion 260 may be in direct contact with the uppermost surface 281 of the lower portion 280 of the second web 200.

The barrier portion 260 may comprise a barrier layer 265. The barrier layer 265 may have a first major surface 266 opposite a second major surface 267. The barrier layer 265 may have a barrier thickness $t_B$ as measured by the distance between the first major surface 266 and the second major surface 267 of the barrier layer 265. The barrier thickness $t_B$ may range from about 5 µm to about 40 µm—including all thickness and sub-ranges there-between. In a preferred embodiment, the barrier thickness $t_B$ may range from about 10 µm to about 20 µm—including all thickness and sub-ranges there-between.

The barrier layer 265 may comprise a polymeric barrier material. The barrier layer 265 may consist essentially of the polymeric barrier material. The barrier layer 265 may consist of the polymeric barrier material. The polymeric barrier material blocks the transmission of oxygen and water between the first and second major surfaces 266, 267 of the barrier layer 265. The polymeric barrier material of the present invention may include polymers of ethylene-vinyl-alcohol (EVOH). According to the present invention, the polymeric barrier material may consist of EVOH polymer.

In some embodiments, the polymeric barrier material may be substantially free of polyamide. In some embodiments, the barrier layer 265 may be substantially free of polyamide. In some embodiments, the polymeric barrier material may be substantially free of polyacrylonitrile. In some embodiments, the barrier layer 265 may be substantially free of polyacrylonitrile. In some embodiments, the polymeric barrier material may be substantially free of polyketones. In some embodiments, the barrier layer 265 may be substantially free of polyketones. In some embodiments, the barrier layer 265 may be substantially free of non-polymeric barrier materials, such as metal foils—e.g., aluminum foil. In some embodiments, the barrier portion 260 may be substantially free of non-polymeric barrier materials, such as metal foils—e.g., aluminum foil.

The overall multi-layer structure 50 may be substantially free of a metal-containing layer. The overall multi-layer structure 50 may be free of a metal-containing layer. The overall multi-layer structure 50 may be substantially free of a cellulosic-containing layer. The overall multi-layer structure 50 may be free of a cellulosic-containing layer.

The barrier portion 260 may further comprise one or more tie layers 271, 275. The tie layers 271, 275 in the barrier portion 260 may also be referred to as "barrier tie layers" as the layers comprise material specifically selected to bond the barrier material to the adjacent polyolefin layers of the first and/or second webs 100, 200. The barrier tie layers may comprise a polymeric material that includes a tie resin (e.g., ethylene acrylic acid (EAA), a functionalized polyolefin—such as anhydride-modified LLDPE—and the like).

The tie layers 271, 275 may help bond/adhere the upper and lower portions 220, 280 to the barrier layer 261. The tie layer 271, 275 may consist essentially of the polymeric material that is the tie resin (e.g., ethylene acrylic acid (EAA), a functionalized polyolefin—such as anhydride-modified LLDPE—and the like). Each tie layers 271, 275 may consist of the tie resin (e.g., ethylene acrylic acid (EAA), a functionalized polyolefin—such as anhydride-modified LLDPE—and the like).

In some embodiments, the barrier portion 260 may comprise a first tie layer 271 located between the barrier layer 265 and the upper portion 220 of the second web 200. The first tie layer 271 may comprise a first major surface 272 opposite a second major surface 273. The first major surface 272 of the first tie layer 271 may be in direct contact with the lowermost surface 222 of the upper portion 220 of the second web 200. The first major surface 272 of the first tie layer 271 may be in direct contact with the second major surface 237 of the bottom layer 235 of the upper portion 220 of the second web 200. The second major surface 273 of the first tie layer 271 may be in direct contact with the first major surface 266 of the barrier layer 265.

The first tie layer 271 may have a first tie thickness $t_{T1}$ as measured by the distance between the first major surface 272 and the second major surface 273 of the first tie layer 271. The first tie thickness $t_{T1}$ may range from about 3 µm to about 20 µm—including all thickness and sub-ranges there-between. In some embodiments, the first tie thickness $t_{T1}$ may range from about 4 µm to about 10 µm—preferably from about 5 µm to about 8 µm—including all thickness and sub-ranges there-between. In other embodiments, the first tie thickness $t_{T1}$ may range from about 9 µm to about 40 µm—preferably from about 14 µm to about 20 µm—including all thickness and sub-ranges there-between.

In some embodiments, the barrier portion 260 may comprise a second tie layer 275 located between the barrier layer 265 and the lower portion 280 of the second web 200. The second tie layer 275 may comprise a first major surface 276 opposite a second major surface 277. The first major surface 276 of the second tie layer 275 may be in direct contact with the second major surface 267 of the barrier layer 265. The second major surface 277 of the second tie layer 275 may be in direct contact with uppermost surface 281 of the lower portion 280 of the second web 200. The second major surface 277 of the second tie layer 275 may be in direct contact with the first major surface 292 of the top layer 291 of the lower portion 280 of the second web 200.

The second tie layer 275 may have a second tie thickness $t_{T2}$ as measured by the distance between the first major surface 276 and the second major surface 277 of the second tie layer 275. The second tie thickness $t_{T2}$ may range from about 3 µm to about 20 µm—including all thickness and sub-ranges there-between. In some embodiments, the second tie thickness $t_{T2}$ may range from about 4 µm to about 10 µm—preferably from about 5 µm to about 8 µm—including all thickness and sub-ranges there-between. In other embodiments, the second tie thickness $t_{T2}$ may range from about 9 µm to about 40 µm—preferably from about 14 µm to about 20 µm—including all thickness and sub-ranges there-between.

First Web

Figure 6:
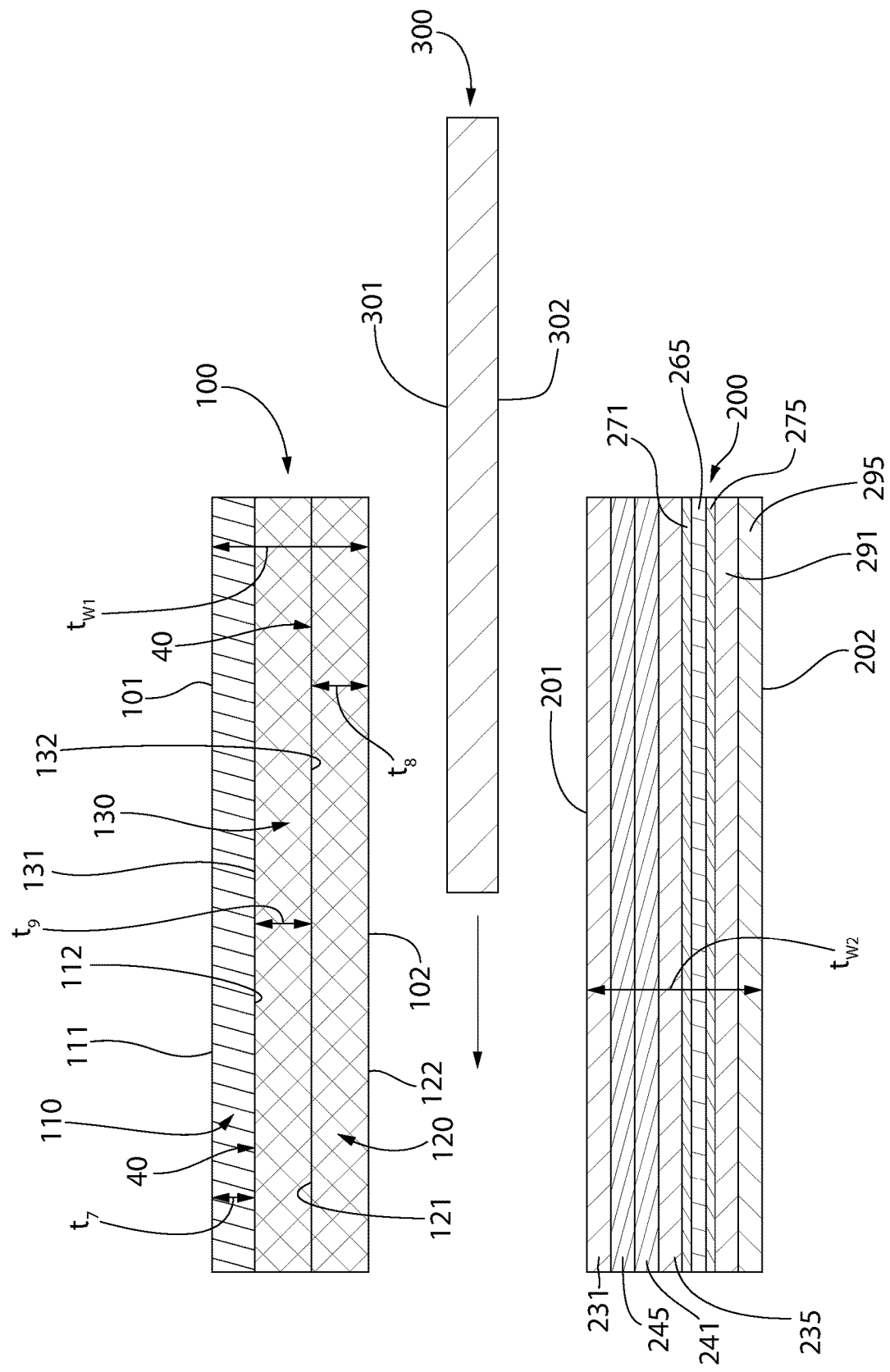
FIG. 6 is a cross-sectional representation of how a sheet according to some embodiments of the present invention are formed using the web of FIGS. 4 and 5.

Referring now to FIGS. 6 and 7, the first web 100 of the sheet 10 may be a multi-layer web (also referred to as a "first multi-layer web"). In other embodiments, the first web 100 of the sheet 10 may be a single-layer web.

The first web 100 may comprise a first layer 110 that forms a top layer or uppermost layer of the first web (referred to herein as "top layer"). The top layer 110 of the first web 100 may have a first major surface 111 opposite a second major surface 112. The top layer 110 of the first web 100 may have a seventh thickness $t_7$ as measured by the distance between the first major surface 111 and the second major surface 112 of the top layer 110 of the first web 100.

The first major surface 111 of the top layer 110 of the first web 100 may form the first major surface 101 of the first web 100. Stated otherwise, the first major surface 101 of the first web 100 may comprise the first major surface 111 of the top layer 110 of the first web 100.

The seventh thickness $t_7$ of the top layer 110 of the first web 100 may range from about 10 µm to about 160 µm—including all thicknesses and sub-ranges there-between. In some embodiments, the seventh thickness $t_7$ of the top layer 110 of the first web 100 may range from about 20 µm to about 80 µm—including all thicknesses and sub-ranges there-between. In some embodiments, the seventh thickness $t_7$ of the top layer 110 of the first web 100 may range from about 25 µm to about 35 µm—including all thicknesses and sub-ranges there-between. In some embodiments, the seventh thickness $t_7$ of the top layer 110 of the first web 100 may be about 30 µm.

The top layer 110 of the first web 100 may be formed from a polymeric material. The top layer 110 of the first web 100 may consist essentially of the polymeric material. The top layer 110 of the first web 100 may consist of the polymeric material. The polymeric material may be high-density polyethylene ("HDPE"). The top layer 110 of the first web 100 may consist essentially of HDPE. The top layer 110 of the first web 100 may consist of HDPE.

In other embodiments, the top layer 110 of the first web 100 may be formed from a polymeric material. The top layer 110 of the first web 100 may consist essentially of the polymeric material. The top layer 110 of the first web 100 may consist of the polymeric material. The polymeric material may be low-density polyethylene ("LDPE"), or linear low-density polyethylene ("LLDPE") or medium-density polythenylene ("MDPE").

The top layer 110 of the first web 100 may consist essentially of HDPE, or LDPE, or LLDPE or MDPE, or their combinations. The top layer 110 of the first web 100 may consist of HDPE, or LDPE, or LLDPE or MDPE or their combinations.

In other embodiments, the top layer 110 of the first web 100 may be formed from a polymeric material and a pigment. The pigment may be in the form of a particle. The top layer 110 of the first web 100 may consist essentially of the polymeric material and the pigment. The top layer 110 of the first web 100 may consist of the polymeric material and the pigment. The polymeric material may be high-density polyethylene ("HDPE") and the pigment may be titanium dioxide. The top layer 110 of the first web 100 may consist essentially of HDPE and the pigment may consist essentially of titanium dioxide. The top layer 110 of the first web 100 may consist of HDPE and titanium dioxide pigment.

The pigment may have a particle size ranging from about 100 nm to about 400 nm—including all sizes and sub-ranges there-between.

The polymeric material may be present in the top layer 110 in an amount ranging from about 70 wt. % to about 90 wt. % based on the total weight of the top layer 110—including all weight percentages and sub-ranges there-between—and the pigment may be present in the top layer 110 in an amount ranging from about 10 wt. % to about 30 wt. % based on the total weight of the top layer 110—including all weight percentages and sub-ranges there-between—whereby the total amount of polymeric material and pigment in the top layer 110 total to 100 wt. %.

In a preferred embodiment, the polymeric material may be present in the top layer 110 in an amount ranging from about 75 wt. % to about 85 wt. % based on the total weight of the top layer 110—including all weight percentages and sub-ranges there-between—and the pigment may be present in the top layer 110 in an amount ranging from about 15 wt. % to about 25 wt. % based on the total weight of the top layer 110—including all weight percentages and sub-ranges there-between—whereby the total amount of polymeric material and pigment in the top layer 110 total to 100 wt. %.

In a non-limiting example, the polymeric material may be present in the top layer 110 in an amount of about 80 wt. % based on the total weight of the top layer 110 and the pigment may be present in the top layer 110 in an amount of about 20 wt. % based on the total weight of the top layer 110—whereby the total amount of polymeric material and pigment in the top layer 110 total to 100 wt. %.

The polymeric material that forms the top layer 110 of the first web 100 may have a density ranging from about 0.9 g/cm$^3$ to about 1.0 g/cm$^3$—including all densities and sub-ranges there-between. In a preferred embodiment, the polymeric material that forms the top layer 110 of the first web 100 may have a density ranging from about 0.93 g/cm$^3$ to about 0.97 g/cm$^3$—including all densities and sub-ranges there-between. In a preferred embodiment, the polymeric material that forms the top layer 110 of the first web 100 may have a density ranging from about 0.934 g/cm$^3$ to about 0.96 g/cm$^3$—including all densities and sub-ranges there-between. In a preferred embodiment, the density of the polymeric material that forms the top layer 110 of the first web 100 may be about 0.935 g/cm$^3$.

The polymeric material that forms the top layer 110 of the first web 100 may have a melt index ranging from about 0.1 g/10 min to about 4.0 g/10 min—including all melt indexes and sub-ranges there-between. In a preferred embodiment, the polymeric material that forms top layer 110 of the first web 100 may have a melt index ranging from about 0.2 g/10 min to about 2.0 g/10 min—including all melt indexes and sub-ranges there-between. In a preferred embodiment, the polymeric material that forms the top layer 110 of the first web 100 may have a melt index that is about 0.5 g/10 min.

The first web 100 may comprise a second layer 120 that forms a bottom layer or bottommost layer of the first web 100 (referred to herein as "bottom layer"). The bottom layer 120 of the first web 100 may have a first major surface 121 opposite a second major surface 122. The bottom layer 120 of the first web 100 may have an eighth thickness $t_8$ as measured by the distance between the first major surface 121 and the second major surface 122 of the bottom layer 120 of the first web 100.

The second major surface 122 of the bottom layer 120 of the first web 100 may form the second major surface 102 of the first web 100. Stated otherwise, the second major surface 102 of the first web 100 may comprise the second major surface 122 of the second layer 120 the first web 100.

The eighth thickness $t_8$ of the bottom layer 120 of the first web 100 may range from about 10 µm to about 100 µm—including all thicknesses and sub-ranges there-between. In some embodiments, the eighth thickness $t_8$ of the bottom layer 120 of the first web 100 may range from about 20 µm to about 70 µm—including all thicknesses and sub-ranges there-between. In some embodiments, the eighth thickness $t_8$ of the bottom layer 120 of the first web 100 may range from about 25 µm to about 40 µm—including all thicknesses and sub-ranges there-between. In some embodiments, the eighth thickness $t_8$ of the bottom layer 120 of the first web 100 may be about 30 µm.

The bottom layer 120 of the first web 100 may be formed from a polymeric material. The bottom layer 120 of the first web 100 may consist essentially of the polymeric material. The bottom layer 120 of the first web 100 may consist of the polymeric material. The polymeric material may be high-density polyethylene ("HDPE"). The bottom layer 120 of the first web 100 may consist essentially of HDPE. The bottom layer 120 of the first web 100 may consist of HDPE.

The polymeric material that forms the bottom layer 120 of the first web 100 may have a density ranging from about 0.9 g/cm$^3$ to about 1.0 g/cm$^3$—including all densities and sub-ranges there-between. In a preferred embodiment, the polymeric material that forms the bottom layer 120 of the first web 100 may have a density ranging from about 0.93 g/cm$^3$ to about 0.97 g/cm$^3$—including all densities and sub-ranges there-between. In a preferred embodiment, the polymeric material that forms the bottom layer 120 of the first web 100 may have a density ranging from about 0.94 g/cm$^3$ to about 0.96 g/cm$^3$—including all densities and sub-ranges there-between. In a preferred embodiment, the density of the polymeric material that forms the bottom layer 120 of the first web 100 may be about 0.95 g/cm$^3$.

The polymeric material that forms the bottom layer 120 of the first web 100 may have a melt index ranging from about 0.8 g/10 min to about 1.2 g/10 min—including all melt indexes and sub-ranges there-between. In a preferred embodiment, the polymeric material that forms the bottom layer 120 of the first web 100 may have a melt index ranging from about 1.0 g/10 min to about 1.2 g/10 min—including all melt indexes and sub-ranges there-between. In a preferred embodiment, the polymeric material that forms the bottom layer 120 of the first web 100 may have a melt index that is about 1.1 g/10 min.

The first web 100 may comprise a third layer 130 that forms an intermediate layer of the first web 100 (referred to herein as "intermediate layer"). The intermediate layer 130 of the first web 100 may have a first major surface 131 opposite a second major surface 132. The intermediate layer 130 of the first web 100 may have a ninth thickness $t_9$ as measured by the distance between the first major surface 131 and the second major surface 132 of the intermediate layer 130 of the first web 100.

The first major surface 131 of the intermediate layer 130 of the first web 100 may face the second major surface 112 of the top layer 110 of the first web 100. The first major surface 131 of the intermediate layer 130 of the first web 100 may directly contact the second major surface 112 of the top layer 110 of the first web 100. The second major surface 132 of the intermediate layer 130 of the first web 100 may face the first major surface 121 of the bottom layer 120 of the first web 100. The second major surface 132 of the intermediate layer 130 of the first web 100 may directly contact the first major surface 121 of the bottom layer 120 of the first web 100.

The ninth thickness $t_9$ of the intermediate layer 130 of the first web 100 may range from about 40 µm to about 100 µm—including all thicknesses and sub-ranges there-between. In some embodiments, the ninth thickness $t_9$ of the bottom layer 120 of the first web 100 may range from about 50 µm to about 90 µm—including all thicknesses and sub-ranges there-between. In some embodiments, the ninth thickness $t_9$ of the bottom layer 120 of the first web 100 may range from about 55 µm to about 70 µm—including all thicknesses and sub-ranges there-between. In some embodiments, the ninth thickness $t_9$ of the bottom layer 120 of the first web 100 may be about 60 µm.

The intermediate layer 130 of the first web 100 may be formed from a polymeric material. The intermediate layer 130 of the first web 100 may consist essentially of the polymeric material. The intermediate layer 130 of the first web 100 may consist of the polymeric material. The polymeric material may be high-density polyethylene ("HDPE"). The intermediate layer 130 of the first web 100 may consist essentially of HDPE. The intermediate layer 130 of the first web 100 may consist of HDPE.

In other embodiments, the intermediate layer 130 of the first web 100 may be formed from a polymeric material and a pigment. The pigment may be in the form of a particle. The intermediate layer 130 of the first web 100 may consist essentially of the polymeric material and the pigment particles. The intermediate layer 130 of the first web 100 may consist of the polymeric material and the pigment. The polymeric material may be high-density polyethylene ("HDPE") and the pigment may be titanium dioxide. The intermediate layer 130 of the first web 100 may consist essentially of HDPE and the pigment may consist essentially of titanium dioxide. The intermediate layer 130 of the first web 100 may consist of HDPE and titanium dioxide pigment.

The pigment may have a particle size ranging from about 100 nm to about 400 nm—including all sizes and sub-ranges there-between.

The polymeric material may be present in the intermediate layer 130 in an amount ranging from about 86 wt. % to about 98 wt. % based on the total weight of the intermediate layer 130—including all weight percentages and sub-ranges there-between—and the pigment may be present in intermediate layer 130 in an amount ranging from about 2 wt. % to about 14 wt. % based on the total weight of intermediate layer 130—including all weight percentages and sub-ranges there-between—whereby the total amount of polymeric material and pigment in the intermediate layer 130 total to 100 wt. %.

In a preferred embodiment, the polymeric material may be present in the intermediate layer 130 in an amount ranging from about 89 wt. % to about 95 wt. % based on the total weight of the intermediate layer 130—including all weight percentages and sub-ranges there-between—and the pigment may be present in the intermediate layer 130 in an amount ranging from about 5 wt. % to about 11 wt. % based on the total weight of the intermediate layer 130—including all weight percentages and sub-ranges there-between—whereby the total amount of polymeric material and pigment in the intermediate layer 130 total to 100 wt. %.

In a non-limiting example, the polymeric material may be present in the intermediate layer 130 in an amount of about 92 wt. % based on the total weight of the intermediate layer 130 and the pigment may be present in the intermediate layer 130 in an amount of about 8 wt. % based on the total weight of the intermediate layer 130—whereby the total amount of polymeric material and pigment in the intermediate layer 130 total to 100 wt. %.

The polymeric material that forms the intermediate layer 130 of the first web 100 may have a density ranging from about 0.9 g/cm$^3$ to about 1.0 g/cm$^3$—including all densities and sub-ranges there-between. In a preferred embodiment, the polymeric material that forms the intermediate layer 130 of the first web 100 may have a density ranging from about 0.93 g/cm$^3$ to about 0.97 g/cm$^3$—including all densities and sub-ranges there-between. In a preferred embodiment, the polymeric material that forms the intermediate layer 130 of the first web 100 may have a density ranging from about 0.94 g/cm$^3$ to about 0.96 g/cm$^3$—including all densities and sub-ranges there-between. In a preferred embodiment, the density of the polymeric material that forms the intermediate layer 130 of the first web 100 may be about 0.95 g/cm$^3$.

The polymeric material that forms the intermediate layer 130 of the first web 100 may have a melt index ranging from about 0.8 g/10 min to about 1.2 g/10 min—including all melt indexes and sub-ranges there-between. In a preferred embodiment, the polymeric material that forms the intermediate layer 130 of the first web 100 may have a melt index ranging from about 1.0 g/10 min to about 1.2 g/10 min—including all melt indexes and sub-ranges there-between. In a preferred embodiment, the polymeric material that forms the intermediate layer 130 of the first web 100 may have a melt index that is about 1.1 g/10 min.

Intermediate Sheet Layer

The intermediate sheet layer 300 may be formed from a polymeric material. The intermediate sheet layer 300 may consist essentially of the polymeric material. The intermediate sheet layer 300 may consist of the polymeric material. The polymeric material may be high-density polyethylene ("HDPE") or low-density polyethylene ("LDPE"). The intermediate sheet layer 300 may consist essentially of HDPE. The intermediate sheet layer 300 may consist of HDPE. The intermediate sheet layer 300 may consist essentially of LDPE. The intermediate sheet layer 300 may consist of LDPE.

The polymeric material that forms the intermediate sheet layer 300 may have a density ranging from about 0.9 g/cm$^3$ to about 1.0 g/cm$^3$—including all densities and sub-ranges there-between. In a preferred embodiment, the polymeric material that forms the intermediate sheet layer 300 may have a density ranging from about 0.91 g/cm$^3$ to about 0.96 g/cm$^3$—including all densities and sub-ranges there-between. In a preferred embodiment, the polymeric material that forms the intermediate sheet layer 300 may have a density ranging from about 0.924 g/cm$^3$ to about 0.94 g/cm$^3$—including all densities and sub-ranges there-between. In a preferred embodiment, the density of the polymeric material that forms the intermediate sheet layer 300 may be about 0.92 g/cm$^3$.

The polymeric material that forms the intermediate sheet layer 300 may have a melt index ranging from about 0.8 g/10 min to about 12 g/10 min—including all melt indexes and sub-ranges there-between. In a preferred embodiment, the polymeric material that forms the intermediate sheet layer 300 may have a melt index ranging from about 1.0 g/10 min to about 10 g/10 min—including all melt indexes and sub-ranges there-between. In a preferred embodiment, the polymeric material that forms the intermediate sheet layer 300 may have a melt index that is about 8.0 g/10 min.

Manufacture

Referring now to FIGS. 2, 12, 13, and 14, the sheet 10 according to some embodiments of the present invention may be formed according to a multi-step manufacturing process (herein referred to as "process"). The process may comprise a blown film processing step comprising a blown film extrusion machine 900. The process may alternatively comprise a cast film processing step comprising a cast film apparatus.

The blown film extrusion machine 900 may comprise one or more extruders 920 arranged around a central die 930. According to stand blown-film practice, air may be blown through the central die 930 causing a bubble 910 to exit the central die 930 for further processing.

According to the present invention the first web 100 and/or the second web 200 may be entirely formed using the blown film extrusion machine. In a non-limiting example, the blown film extrusion machine 900 may comprise a plurality of extruders 921, 922, 923, 924, 925, 926, 927, 928, 929—each of which are loaded with a composition corresponding to an individual layer of the second web 200.

For instance, a first extruder 921 may be loaded with the material that is used to form the bottom layer 295 of the lower portion 280 of the second web 200. A second extruder 922 may be loaded with the material that is used to form the top layer 291 of the lower portion 280 of the second web 200. A third extruder 923 may be loaded with the material that is used to form the second tie layer 275 of the barrier portion 260 of the second web 200. A fourth extruder 924 may be loaded with the material that is used to form the barrier layer 265 of the barrier portion 260 of the second web 200. A fifth extruder 925 may be loaded with the material that is used to form the first tie layer 271 of the barrier portion 260 of the second web 200. A sixth extruder 926 may be loaded with the material that is used to form the bottom layer 235 of the upper portion 220 of the second web 200. A seventh extruder 927 may be loaded with the material that is used to form the first upper intermediate layer 241 of the upper portion 220 of the second web 200. An eighth extruder 928 may be loaded with the material that is used to form the second upper intermediate layer 245 of the upper portion 220 of the second web 200. A ninth extruder 929 may be loaded with the material that is used to form the top layer 231 of the upper portion 220 of the second web 200.

Each of the plurality of extruders 921, 922, 923, 924, 925, 926, 927, 928, 929 may simultaneously extrude the respective material contained therein through the central die 930, whereby the resulting multi-layer extrudate is blown into the bubble 910. The bubble may then pass through one or more guide tents (not pictured), one or more nip rollers (not pictured), and through one or more idler rolls 951, whereby the resulting bubble 910 is reoriented into an intermediate sheet 960 of web material—such as an intermediate sheet 960 of the second web 200—that is collected onto a collection roll 952.

The resulting second web 200 may comprise a plurality of seams or interfaces (hereby referred to as "interfaces") that are formed between the individual layers contained within the second web 200. With each of the layers of the second web 200 being formed contemporaneously via the blown film extrusion process, the interfaces that exist between the layers contained within the second web may be referred to as blown film interfaces 40—whereby such blown film interfaces 40 are the result of a blown film process—as compared to an interface formed by a separate lamination process.

The interface between film layers from film blown process is relatively more tight compared to a lamination interface—as discussed in greater detail herein—because the film layers formed during blown film extrusion are cooled from melt state simultaneously, which creates a relatively better bonding strength between layers.

Referring now to FIGS. 4 and 7, a blown film interface 40 may exist between the upper portion 220 and the barrier portion 260 of the second web 200. Specifically, a blown film interface 40 may exist between the lowermost surface 222 of the upper portion 220 and the uppermost surface 261 of the barrier portion 260 of the second web 200. A blown film interface 40 may exist between the lower portion 280 and the barrier portion 260 of the second web. Specifically, a blown film interface 40 may exist between the uppermost surface 281 of the lower portion 280 and the lowermost surface 262 of the barrier portion 260 of the second web 200.

A blown film interface 40 may exist between the second major surface 233 of the top layer 231 of the upper portion 220 of the second web 200 and the first major surface 246 of the second upper intermediate layer 245 of the upper portion 220 of the second web 200. A blown film interface 40 may exist between the second major surface 247 of the second upper intermediate layer 245 of the upper portion 220 of the second web 200 and the first major surface 242 of the first upper intermediate layer 241 of the upper portion 220 of the second web 200. A blown film interface 40 may exist between the second major surface 243 of the first upper intermediate layer 241 of the upper portion 220 of the second web 200 and the first major surface 236 of the bottom layer 235 of the upper portion 220 of the second web 200. A blown film interface 40 may exist between the second major surface 237 of the bottom layer 235 of the upper portion 220 of the second web 200 and the uppermost surface 261 of the barrier portion 260.

A blown film interface 40 may exist between the second major surface 237 of the bottom layer 235 of the upper portion 220 of the second web 200 and the first major surface 272 of the first tie layer 271 of the barrier portion 260 of the second web 200. A blown film interface 40 may exist between the second major surface 273 of the first tie layer 271 of the barrier portion 260 of the second web 200 and the first major surface 266 of the barrier layer 265 of the barrier portion 260 of the second web 200. A blown film interface 40 may exist between the second major surface 267 of the barrier layer 265 of the barrier portion 260 of the second web 200 and the first major surface 276 of the second tie layer 275 of the barrier portion 260 of the second web 200. A blown film interface 40 may exist between the second major surface 277 of the second tie layer 275 of the barrier portion 260 of the second web 200 and the uppermost surface 281 of the lower portion 280.

A blown film interface 40 may exist between the second major surface 277 of the second tie layer 275 of the barrier portion 260 of the second web 200 and the first major surface 292 of the top layer 291 of the lower portion 280 of the second web 200. A blown film interface 40 may exist between the second major surface 293 of the top layer 291 of the lower portion 290 of the second web 200 and the first major surface 296 of the bottom layer 295 of the lower portion 280 of the second web 200.

The blown film extrusion machine 900 may also be used to form the first web. For instance, a first extruder 921 may be loaded with the material that is used to form the bottom layer 120 of the first web 100. A second extruder 922 may be loaded with the material that is used to form the intermediate layer 130 of the first web 100. A third extruder 923 may be loaded with the material that is used to form the top layer 110 of the first web 100.

Each of the plurality of extruders 921, 922, 923, may simultaneously extrude the respective material contained therein through the central die 930, whereby the resulting multi-layer extrudate is blown into the bubble 910. The bubble may then pass through one or more guide tents (not pictured), one or more nip rollers (not pictured), and through one or more idler rolls 951, whereby the resulting bubble 910 is reoriented into an intermediate sheet 960 of web material—such as an transitional sheet 960 of the first web 100—that is collected onto a collection roll 952.

The resulting first web 100 may comprise a plurality of blown film interfaces 40. Referring now to FIGS. 6 and 7, a blown film interface 40 may exist between the top layer 110 of the first web 100 and the intermediate layer 130 the first web 100. Specifically, a blown film interface 40 may exist between the second major surface 112 of the top layer 110 of the first web 100 and the first major surface 131 of the intermediate layer 130 of the first web 100. A blown film interface 40 may exist between the intermediate layer 130 of the first web 100 and the bottom layer 120 the first web 100. Specifically, a blown film interface 40 may exist between the second major surface 132 of the intermediate layer 130 of the first web 100 and the first major surface 121 of the bottom layer 120 of the first web 100.

In other embodiments, each of the first web 100 and the second web 200 may be formed via a cast film extrusion process—whereby the melt extrudate corresponding to the multi-layers of each of the first web 100 and the second web 200 are coextruded together and joined via cast film. According to the embodiments where each of the first web 100 and the second web 200 are formed via cast film extrusion—the individual layers will also comprise cast film interfaces, which correspond to the blown film interfaces 40 of the blown film embodiments. The cast film interfaces 40 are not laminated interfaces as the interface formed between melt extrudate that forms the layers of the cast film are simultaneously cooled from the melt like blown film.

Figure 14:
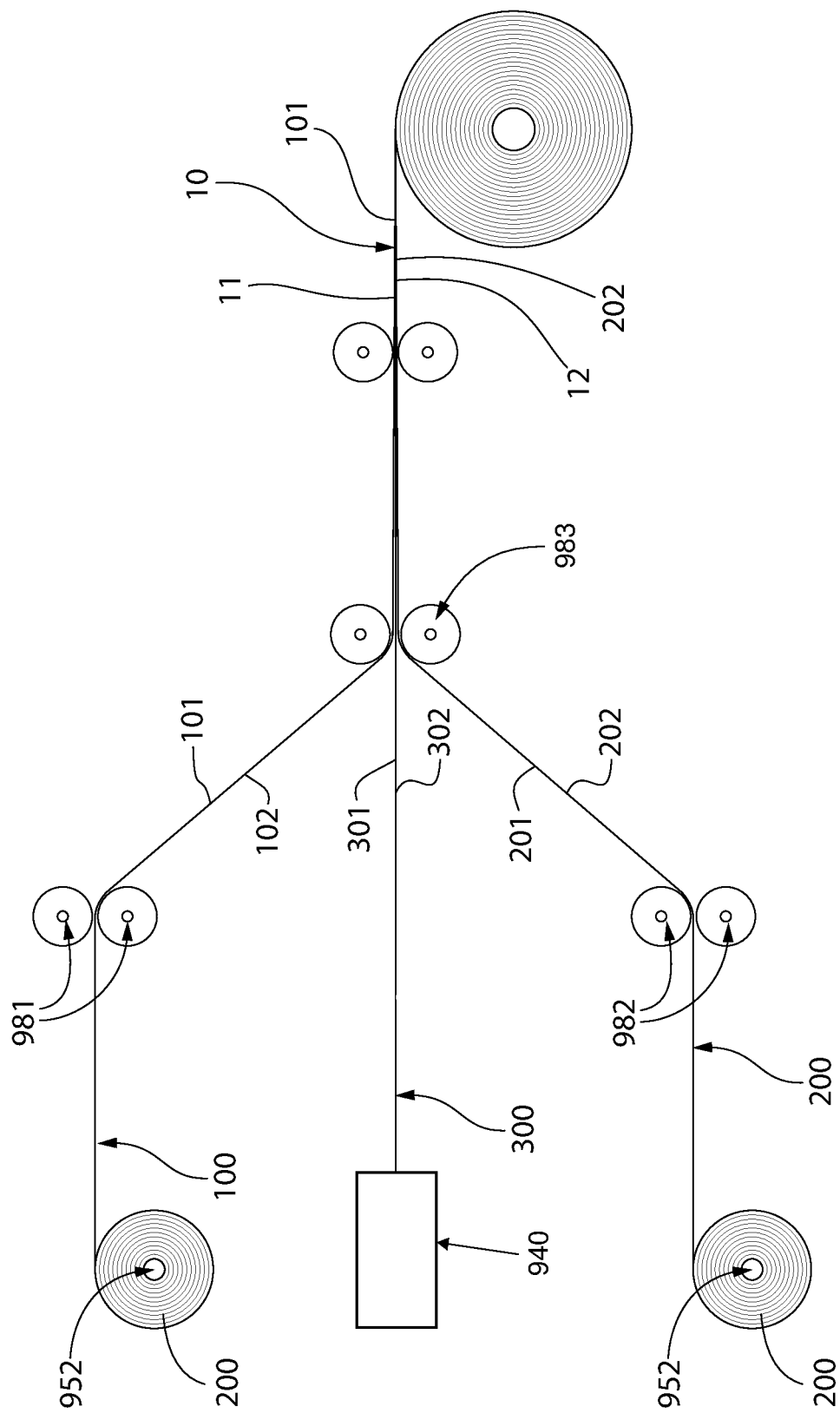
FIG. 14 is a processing apparatus further showing how the sheet of the present invention may be formed.
Figure 15:
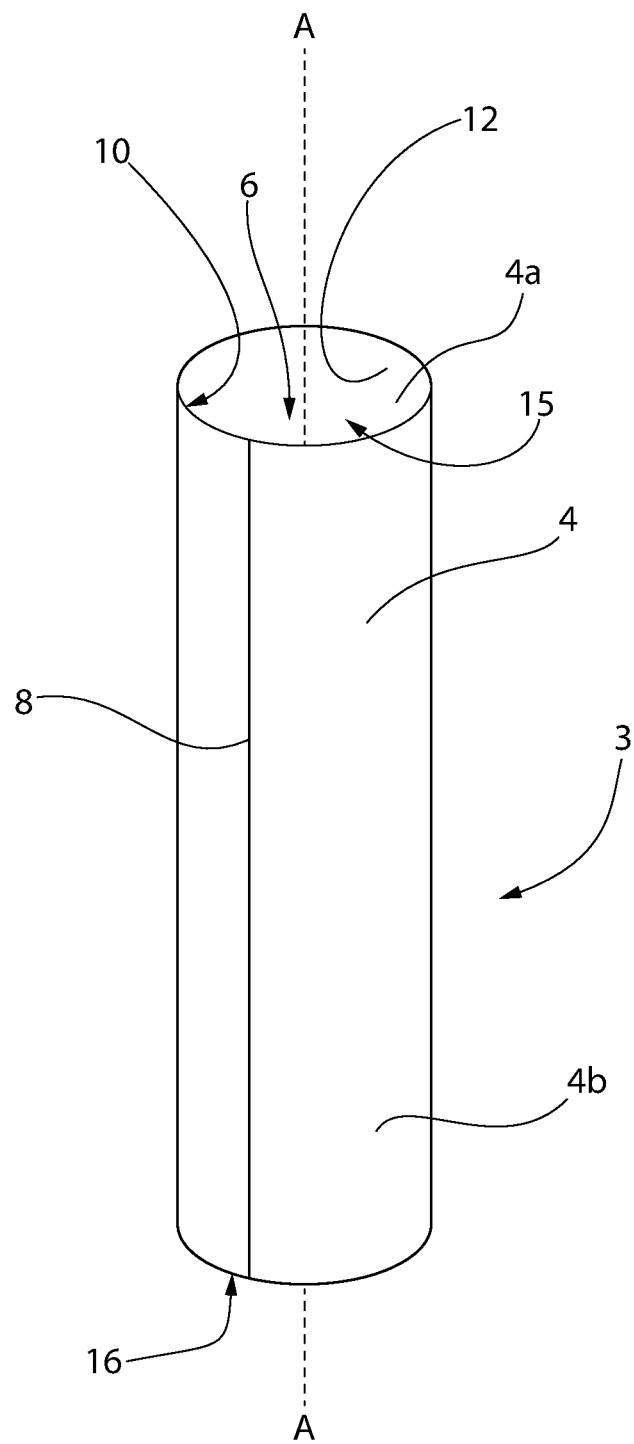
FIG. 15 is an open-tube formed from the sheet according to some embodiments of the present invention.

Referring now to FIG. 14, the intermediate sheet layer 300 may be formed by extrusion lamination process. Specifically, the intermediate sheet layer 300 may be formed from a resin and extruded from an extruder 940 at the time of laminating the first web 100 and the second web 200. The extrudate leaving the extruder 940 may be in the form of a resin melt at the time it contacts the first web 100 and second web 200, thereby bonding the first and second webs 100, 200 together via the resulting intermediate sheet layer 300. Specifically, the lamination process may comprise passing the transitional sheets of the first web 100 and the second web 200 through a plurality of respective nip rollers 981, 982 to form a final thickness of the respective first and second web 100, 200. The first web 100, the resin melt that forms the intermediate sheet layer 300, and the second web 200 may then pass through a second set of rollers 983, whereby the transitional sheets of the first web 100, the resin melt that forms the intermediate sheet layer 300, and the second web 200 are laminated together. The second set of rollers 983 may comprise a nip roller and a chill roll, whereby pressure is applied to the nip roll via a pressure roll and the chill roll is cooled to a temperature to cool the resulting multi-layer structure. The resulting multi-layer structure 10 may form a sheet that is collected onto a storage roll.

The resulting sheet 10 may comprise a plurality of seams or interfaces (hereby referred to as "interfaces") that are formed between the first web 100, the intermediate sheet layer 300, and the second web 200. With each of the first web 100, the intermediate sheet layer 300, and the second web 200 being joined together by a lamination process (as compared to a cast-film or blown-film extrusion process), the interface that exists between the first web 100 and the intermediate sheet layer 300, as well as the interface that exists between the intermediate sheet layer 300 and the second web 200 may be referred to as a lamination interface 30—whereby such lamination interface 30 is the result of a lamination process—as compared to an interface formed by a blown-film extrusion process.

According to the present invention a lamination interface is created between a melt extrudate and a preformed film surface. The strength of the bond at the lamination interface will depend on the compatibility of the two surfaces meeting to form the interface. If good chemical compatibility exists at the interface, the lamination interface will be relatively strong. If poor chemical compatibility exists at the interface, the lamination interface will be weak. The bonding strength at a lamination interface is typically weaker than the bonding strength of a coextruded or cast film interface.

Referring now to FIG. 7, a lamination interface 30 may exist between the first web 100 and the intermediate sheet layer 300. Specifically, a lamination interface 30 may exist between the second major surface 102 of the first web 100 and the first major surface 301 of the sheet intermediate layer 300. Specifically, a lamination interface 30 may exist between the second major surface 122 of the bottom layer 120 of the first web 100 and the first major surface 301 of the sheet intermediate layer 300.

A lamination interface 30 may exist between the second web 200 and the intermediate sheet layer 300. Specifically, a lamination interface 30 may exist between the second major surface 302 of the sheet intermediate layer 300 and the first major surface 201 of the second web 200. A lamination interface 30 may exist between the sheet intermediate layer 300 and the upper portion 220 of the second web 200. Specifically, a lamination interface 30 may exist between the second major surface 302 of the sheet intermediate layer 300 and the uppermost surface 221 of the upper portion 220 of the second web 200. A lamination interface 30 may exist between the sheet intermediate layer 300 and the top layer 231 of the upper portion 220 of the second web 200. Specifically, a lamination interface 30 may exist between the second major surface 302 of the sheet intermediate layer 300 and the first major surface 232 of the top layer 231 of the upper portion 220 of the second web 200.

Figure 5:
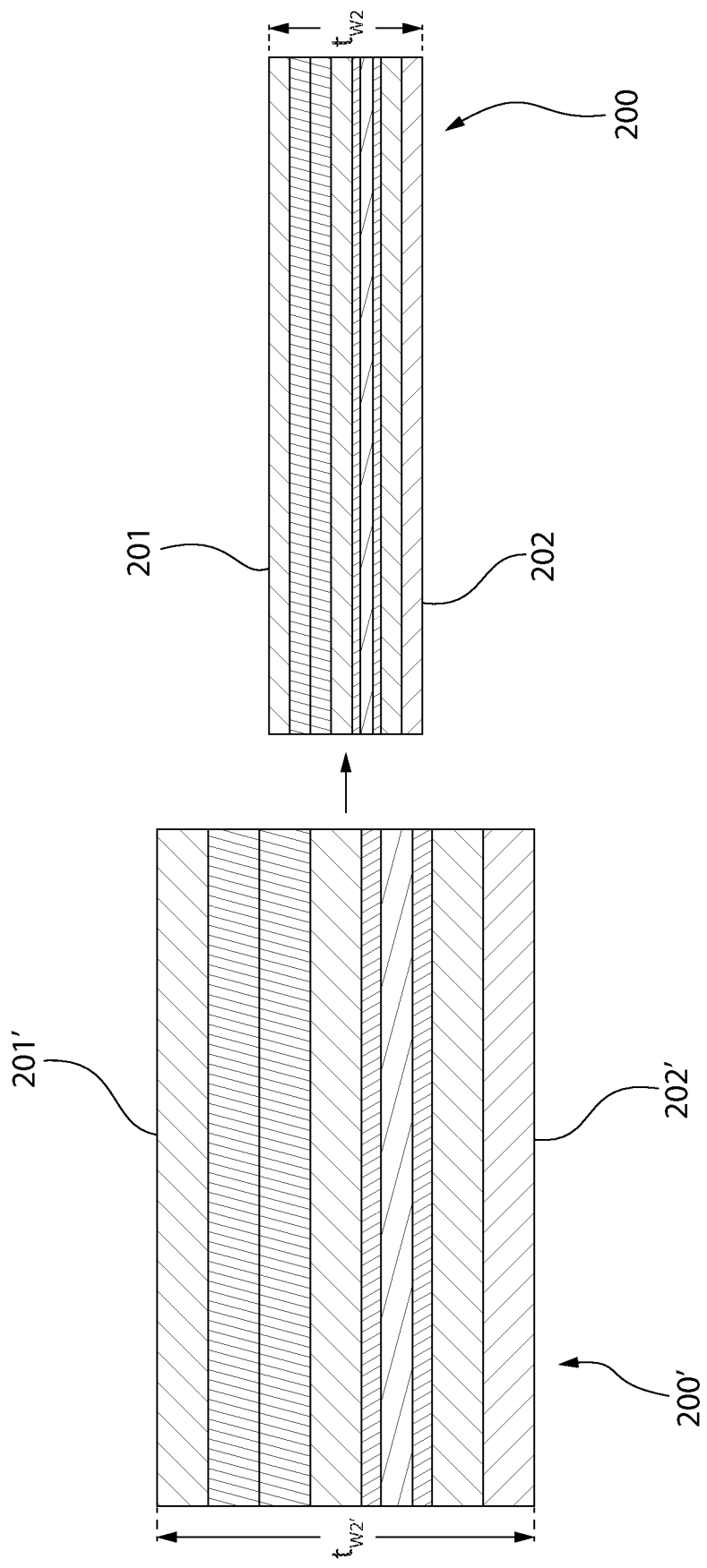
FIG. 5 is a cross-sectional view of the web of FIG. 4 being processes according to the method of the present invention.

Referring now to FIG. 5, an initial second web 200' may be provided at an initial second web thickness $t_{W2}'$—whereby the initial second web 200' may be passed between the second set of nip rollers 982, whereby the second set of nip rollers 982 are configured to have a nip opening that results in the final second web 200 having the final second web thickness $t_{W2}$. The final second thickness $t_{W2}$ may be smaller than the initial second web thickness $t_{W2}'$. The final second web thickness $t_{W2}$ may be equal to about 20% to about 100% of the initial second web thickness $t_{W2}'$—including all percentages and sub-ranges there-between Referring now to FIGS. 15-18, the resulting sheet 10 may be further processed into a container 1. The process of forming the sheet 10 into the container 1 may comprise cutting the sheet 10 to a size suitable for the container 1, followed by folding the portion of the sheet 10 onto itself to form a tube 3 that extends along a longitudinal axis A-A. The tube 3 may have a first open end 15 that is opposite a second open end 16 that both intersect the longitudinal axis A-A. The portion of the sheet 10 that is folded onto itself may be joined to form a longitudinal seam 8 that extends substantially parallel to the longitudinal axis A-A. The longitudinal seam 8 may be heat-sealed.

The tube 3 may comprise a tube wall 4 formed at least in part of the sheet 10. The tube wall 4 may comprise an inner surface 4a that is opposite an outer surface 4b. The inner surface 4a of the tube wall 4 may face inward toward the longitudinal axis A-A. The inner surface 4a of the tube wall 4 may define a cavity 6. The inner surface 4a of the tube wall 4 may comprise the second exposed major surface 12 of the sheet 10.

In forming the container 1, the second open end 16 of the tube 3 may be sealed to form a closed end 9 of the container. The second open end 16 may be closed by heat-sealing—whereby the second major surface 12 of the sheet 10 contacts itself to from a heat-sealed weld. A shoulder portion 7 of the container 1 may be joined to the first open end 15 of the tube 3, whereby the shoulder portion 7 comprises a port configured to be attached to a removable cap 2.

The tube 3 having the tube wall 4 formed from the multi-layer structure 50 results in the tube 3 being recyclable. Specifically, together, the individual layers of the multi-layer structure 50 result in the overall multi-layer structure 50 having an overall melt index that ranges from about 0.7 g/10 min to about 1.1 g/10 min—including all melt indexes and sub-ranges there-between. Having the overall multi-layer structure 50 exhibit such melt index allows the overall tube 3 to be processed according to pre-existing HDPE bottle recycling streams. Therefore, the overall melt index of the overall multi-layer structure 50 allows the tube 3 to be readily recycled according to existing HDPE bottle recycling streams.

Figure 18:
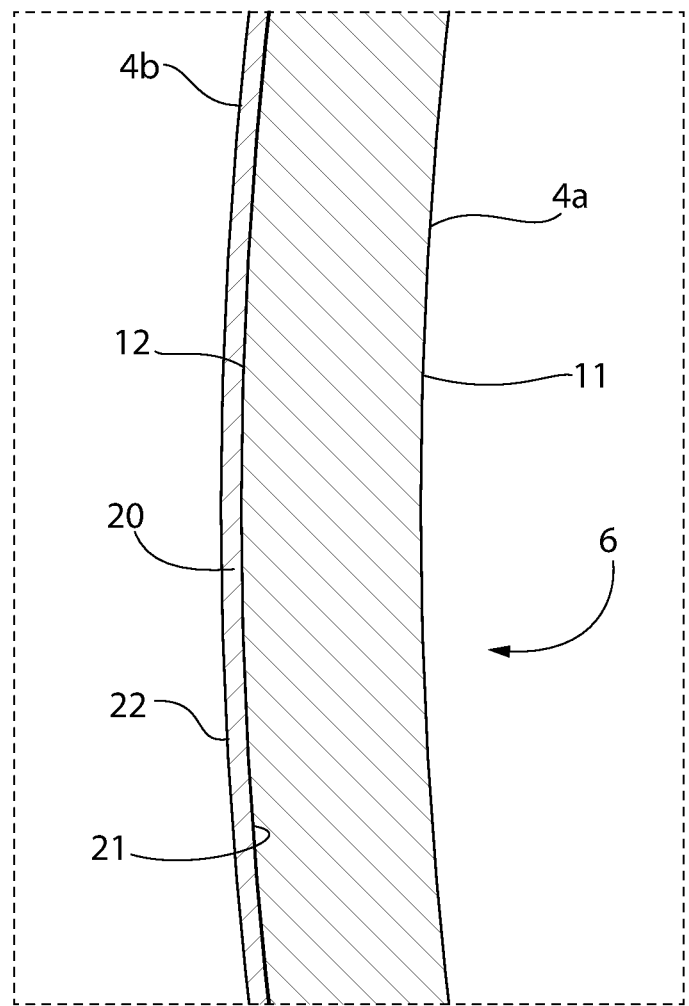
FIG. 18 is a close-up view of the region V in FIG. 17.

Referring now to FIG. 18, the container 1 may further comprise one or more print layers 20 applied to the first exposed major surface 11 of the sheet 10 on the tube 10. Specifically, the print layer 20 may comprise an inner surface 21 opposite an outer surface. The inner surface of the print layer may face the first exposed major surface 11 of the sheet 10 on the tube 10. The inner surface of the print layer may directly contact the first exposed major surface 11 of the sheet 10 on the tube 10. At least a portion of the outer surface 4b of the tube wall 4 may comprise the outer surface 22 of the print layer 20.

The container 1 of the present invention may be a flexible packaging. The flexible packaging may include, but is not limited to, a body that defines the cavity 6 having an internal volume in which a consumer product may be stored. The consumer product may be almost any viscous liquid, gel, or paste product, examples of which include toothpaste, mouthwash, condiments (e.g., ketchup, mustard, mayonnaise), soap, detergent, medicinal preparations, bodywash, body lotion, shampoo, cosmetic products (e.g., creams).

In at least one embodiment, an insert (not shown) may be positioned under or lining the inside of the shoulder portion 7, for example, to prevent the flavor/fragrance of the consumer product from leaching into or leaking through the shoulder portion 7. The flexible packaging 1 may also include the removable cap 2 that is used to cover an opening through which the consumer product may flow. The cap 2 may be made from polypropylene or high-density polyethylene. The cap 2 does not affect the recyclability because 1) it can be removed and separated from the tube body and 2) in the recycling industry, there is a certain level of tolerance of polypropylene in HDPE; therefore, the recommendation from recycling industry is to leave the cap on for bottles, such as detergent bottles.

Alternative Embodiments

Although not pictured, in some embodiments the sheet 10 may comprise only the second web 200. In such embodiments, the uppermost layer 211 of the second web 200 may form at least a portion of the first exposed major surface 11 of the sheet 10 and the lowermost layer 212 of the second web 200 may form at least a portion of the second exposed major surface 12 of the sheet 10. Stated otherwise, the first exposed major surface 11 of the sheet 10 may comprise the uppermost layer 211 of the second web 200 and the second exposed major surface 12 of the sheet 10 may comprise the lowermost layer 212 of the second web 200.

In such embodiments, the uppermost surface 221 of the upper portion 220 of the second web 200 may form at least a portion of the first exposed major surface 11 of the sheet 10 and the lowermost surface 282 of the lower portion 280 of the second web 200 may form at least a portion of the second exposed major surface 12 of the sheet 10. Stated otherwise, the first exposed major surface 11 of the sheet 10 may comprise the uppermost surface 221 of the upper portion 220 of the second web 200 and the second exposed major surface 12 of the sheet 10 may comprise the lowermost surface 282 of the lower portion 280 of the second web 200.

In such embodiments, the first major surface 232 of the top layer 231 of the upper portion 220 of the second web 200 may form at least a portion of the first exposed major surface 11 of the sheet 10 and the second major surface 297 of the bottom layer 295 of the lower portion 280 of the second web 200 may form at least a portion of the second exposed major surface 12 of the sheet 10. Stated otherwise, the first exposed major surface 11 of the sheet 10 may comprise the first major surface 232 of the top layer 231 of the upper portion 220 of the second web 200 and the second exposed major surface 12 of the sheet 10 may comprise the second major surface 297 of the bottom layer 295 of the lower portion 280 of the second web 200.

In such embodiments, the second web thickness $t_{W2}$ may be substantially equal to the sheet thickness $t_s$ of the sheet 10.

Figure 8:
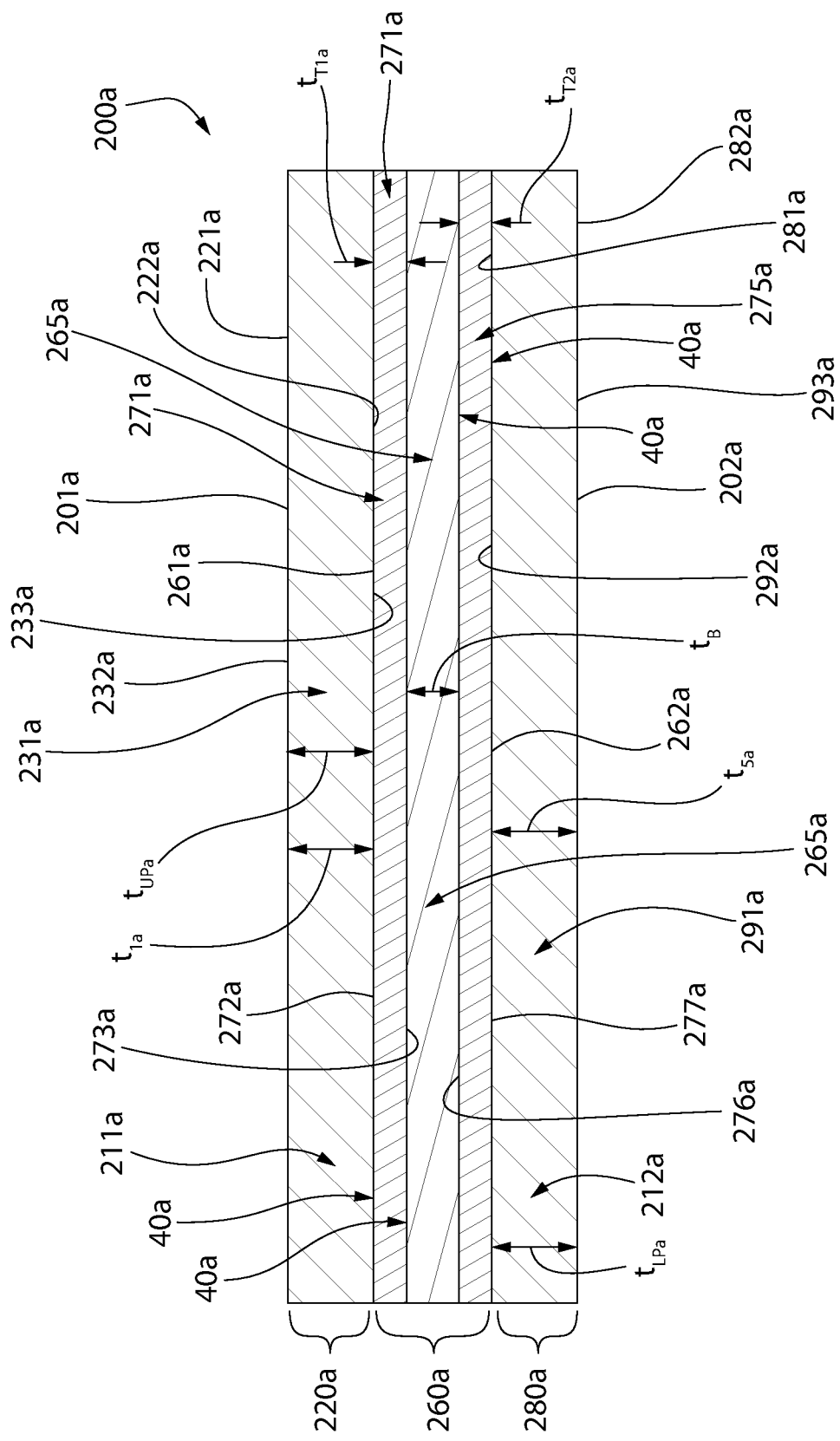
FIG. 8 is a cross-section view of a web that forms part of the sheet according to another embodiment of the present invention.
Figure 9:
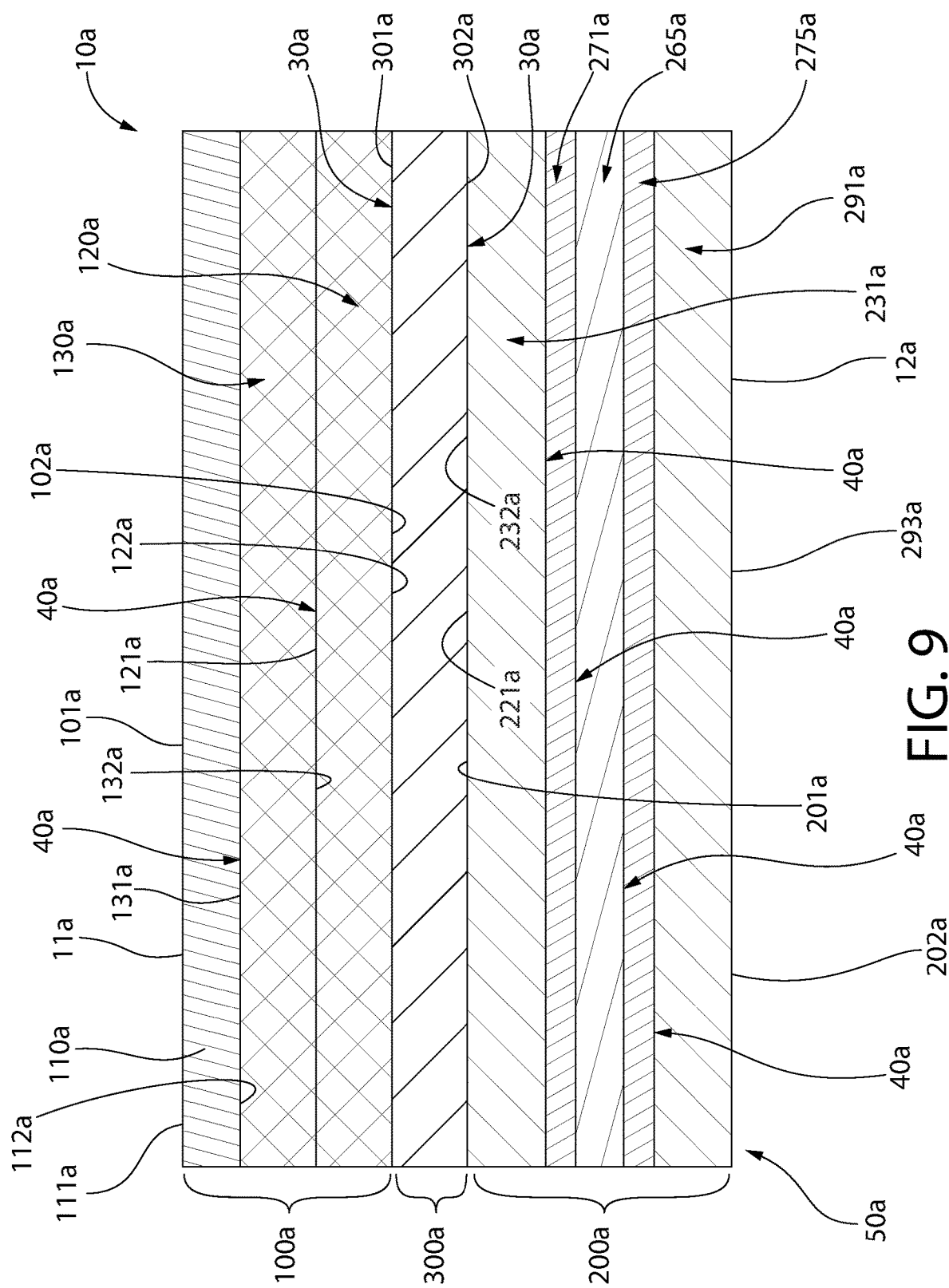
FIG. 9 is a cross-section view of a sheet taken along lines X-X of FIG. 1 according to another embodiment of the present invention that comprises the web of FIG. 8.

Referring now to FIGS. 8 and 9, a sheet 10a is illustrated in accordance with another embodiment of the present invention. The sheet 10a is similar to the sheet 10 except as described herein below. The description of the sheet 10 above generally applies to the sheet 10a described below except with regard to the differences specifically noted below. A similar numbering scheme will be used for the sheet 10a as with the sheet 10 except that the a-suffix will be used.

The sheet 10a may comprise a first web 100a, an intermediate sheet layer 300a, and a second web 200a. The second web 200a may be a multi-layer web (also referred to as a "second multi-layer web").

The second web 200a may comprise an uppermost layer 211a opposite a lowermost layer 212a. The second web 200a may comprise a upper portion 220a, a lower portion 280a, and a barrier portion 260a. The upper portion 220a of the second web 200a may comprise the uppermost layer 211a of the second web 200a and the lower portion 280a of the second web 200a may comprise the lowermost layer 212a of the second web 200a.

The upper portion 220a of the second web 200a may comprise a first layer 231a having a first major surface 232a opposite a second major surface 233a. The first layer 231a may be the sole layer of the upper portion 220a—i.e., the upper portion 220a consists of the first layer 231a.

The first major surface 232a of the first layer 231a of the upper portion 220a of the second web 200a may form the first major surface 201a of the second web 200a. Stated otherwise, the first major surface 201a of the second web 200a may comprise the first major surface 232a of the first layer 231a of the upper portion 220a of the second web 200a.

The first major surface 232a of the first layer 231a may form the uppermost surface 221a of the upper portion 220a of the second web 200a. Stated otherwise, the uppermost surface 221a of the upper portion 220a of the second web 200a may comprise the first major surface 232a of the first layer 231a.

The second major surface 233a of the first layer 231a of the upper portion 220a of the second web 200a may form the lowermost surface 222a of the upper portion 220a of the second web 200a. Stated otherwise, the lowermost surface 222a of the upper portion 220a of the second web 200a may comprise the second major surface 233a of the first layer 231a of the upper portion 220a of the second web 200a.

The first layer 231a of the upper portion 220a of the second web 200a may have a first thickness $t_{1_a}$ as measured by the distance between the first major surface 232a and the second major surface 233a of the first layer 231a of the upper portion 220a of the second web 200a.

The first thickness $t_{1_a}$ of the first layer 231a may range from about 10 μm to about 500 μm—including all thicknesses and sub-ranges there-between. In some embodiments, the first thickness $t_{1_a}$ of the first layer 231a may range from about 20 μm to about 300 μm—including all thicknesses and sub-ranges there-between. In some embodiments, the first thickness $t_{1_a}$ of the first layer 231a may range from about 40 μm to about 200 μm—including all thicknesses and sub-ranges there-between. In some embodiments, the first thickness $t_{1_a}$ of the first layer 231a may be about 150 μm.

The first layer 231a of the upper portion 220a of the second web 200a may be formed from a polymeric material. The first layer 231a of the upper portion 220a of the second web 200a consist essentially of the polymeric material. The first layer 231a of the upper portion 220a of the second web 200a may consist of the polymeric material. The polymeric material may be high-density polyethylene ("HDPE"). The first layer 231a of the upper portion 220a of the second web 200a may consist essentially of HDPE. The first layer 231a of the upper portion 220a of the second web 200a may consist of HDPE.

The polymeric material that forms the first layer 231a of the upper portion 220a may be the same as the polymeric material described as forming the top layer 231 of the upper portion 220 of the second web 200 of the sheet 10 of the previous embodiment.

The lower portion 280a of the second web 200a may comprise a second layer 291a having a first major surface 292a opposite a second major surface 293a. The second layer 291a may be the sole layer of the lower portion 280a—i.e., the lower portion 280a consists of the second layer 291a.

The second major surface 293a of the second layer 291a of the lower portion 280a of the second web 200a may form the first major surface 201a of the second web 200a. Stated otherwise, the second major surface 202a of the second web 200a may comprise the second major surface 233a of the second layer 293a of the lower portion 280a of the second web 200a.

The second major surface 293a of the second layer 291a may form the lowermost surface 282a of the lower portion 280a of the second web 200a. Stated otherwise, the lowermost surface 282a of the lower portion 280a of the second web 200a may comprise the second major surface 293a of the second layer 291a.

The first major surface 292a of the second layer 291a of the lower portion 280a of the second web 200a may form the uppermost surface 281a of the lower portion 280a of the second web 200a. Stated otherwise, the uppermost surface 281a of the lower portion 280a of the second web 200a may comprise the first major surface 292a of the second layer 291a of the lower portion 280a of the second web 200a.

The second layer 291a of the lower portion 280a of the second web 200a may have a second thickness $t_{5_a}$ as measured by the distance between the first major surface 292a and the second major surface 293a of the second layer 291a of the lower portion 280a of the second web 200a.

The second thickness $t_{5_a}$ of the second layer 291a may range from about 10 μm to about 200 μm—including all thicknesses and sub-ranges there-between. In some embodiments, the second thickness $t_{5_a}$ of the second layer 291a may range from about 20 μm to about 100 μm—including all thicknesses and sub-ranges there-between. In some embodiments, the second thickness $t_{5_a}$ of the second layer 291a may range from about 30 μm to about 80 μm—including all thicknesses and sub-ranges there-between. In some embodiments, the second thickness $t_{5_a}$ of the second layer 291a may be about 45 μm.

The second layer 291a of the lower portion 280a of the second web 200a may be formed from a polymeric material. The second layer 291a of the lower portion 280a of the second web 200a consist essentially of the polymeric material. The second layer 291a of the lower portion 280a of the second web 200a may consist of the polymeric material. The polymeric material may be high-density polyethylene ("HDPE"). The second layer 291a of the lower portion 280 of the second web 200a may consist essentially of HDPE. The second layer 291a of the lower portion 280 of the second web 200a may consist of HDPE.

The polymeric material that forms the second layer 291a of the lower portion 280 may be the same as the polymeric material described as forming the top layer 291 of the lower portion 280 of the second web 200 of the sheet 10 of the previous embodiment.

The resulting sheet 10a formed from the second web 200a according to this embodiment may comprise a number of blown-film interfaces 40a as well as laminate interfaces 30a.

A lamination interface 30a may exist between the second web 200a and the intermediate sheet layer 300a. Specifically, a lamination interface 30a may exist between the second major surface 302a of the sheet intermediate layer 300a and the first major surface 201a of the second web 200a. A lamination interface 30a may exist between the sheet intermediate layer 300a and the upper portion 220a of the second web 200a. Specifically, a lamination interface 30a may exist between the second major surface 302a of the sheet intermediate layer 300a and the uppermost surface 221a of the upper portion 220a of the second web 200a.

A lamination interface 30a may exist between the sheet intermediate layer 300a and the first layer 231a of the upper portion 220a of the second web 200a. Specifically, a lamination interface 30a may exist between the second major surface 302a of the sheet intermediate layer 300a and the first major surface 232a of the first layer 231a of the upper portion 220a of the second web 200a.

A blown film interface 40a may exist between the second major surface 233a of the first layer 231a of the upper portion 220a of the second web 200a and the uppermost surface 261a of the barrier portion 260a. A blown film interface 40a may exist between the second major surface 233a of the first layer 231a of the upper portion 220a of the second web 200a and the first major surface 272a of the first tie layer 271a of the barrier portion 260a of the second web 200a.

A blown film interface 40a may exist between the first major surface 292a of the second layer 291a of the lower portion 280a of the second web 200a and the lowermost surface 262a of the barrier portion 260a. A blown film interface 40a may exist between the first major surface 292a of the second layer 291a of the lower portion 280a of the second web 200a and the second major surface 277a of the second tie layer 275a of the barrier portion 260a of the second web 200a.

Figure 10:
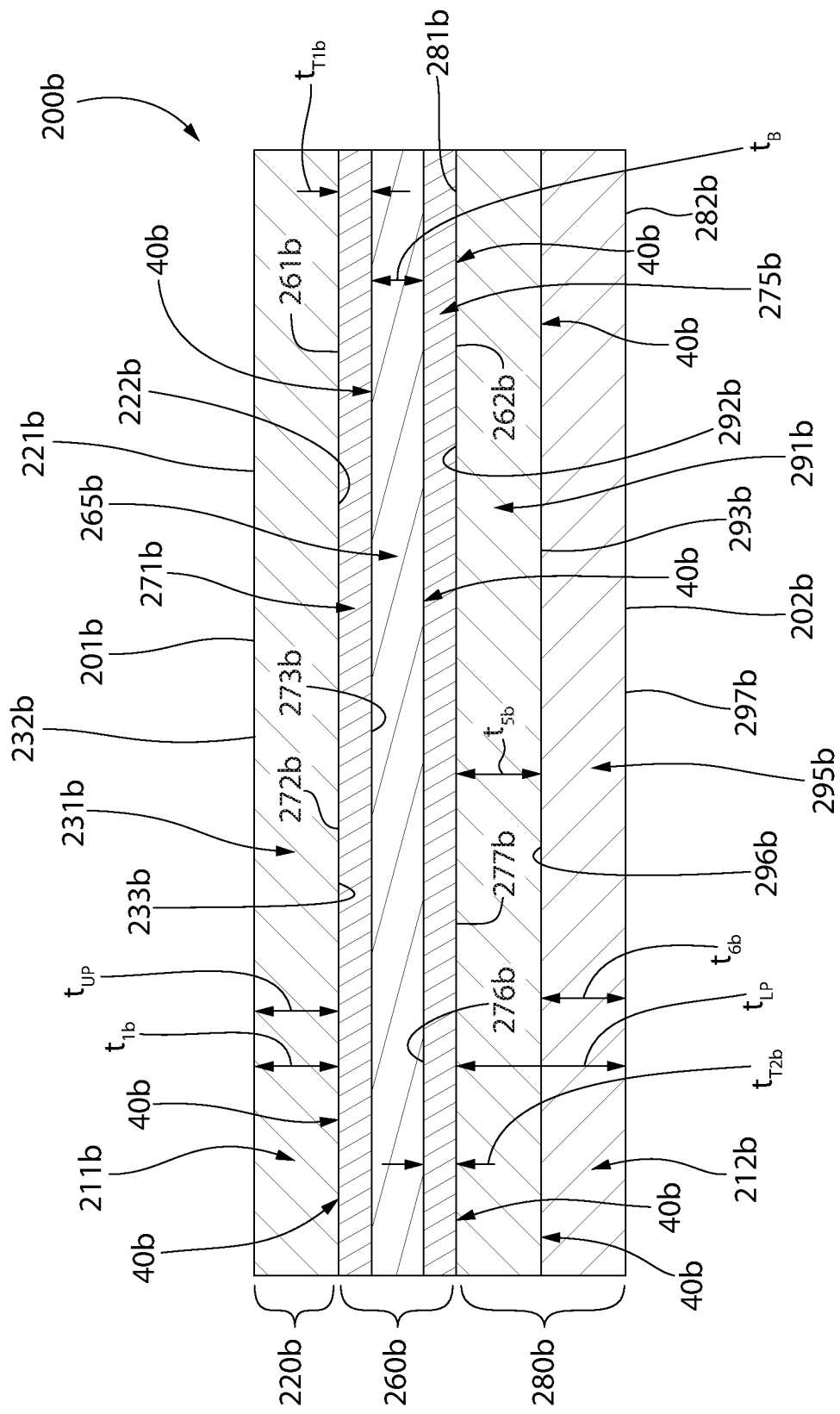
FIG. 10 is a cross-section view of a web that forms part of the sheet according to another embodiment of the present invention.
Figure 11:
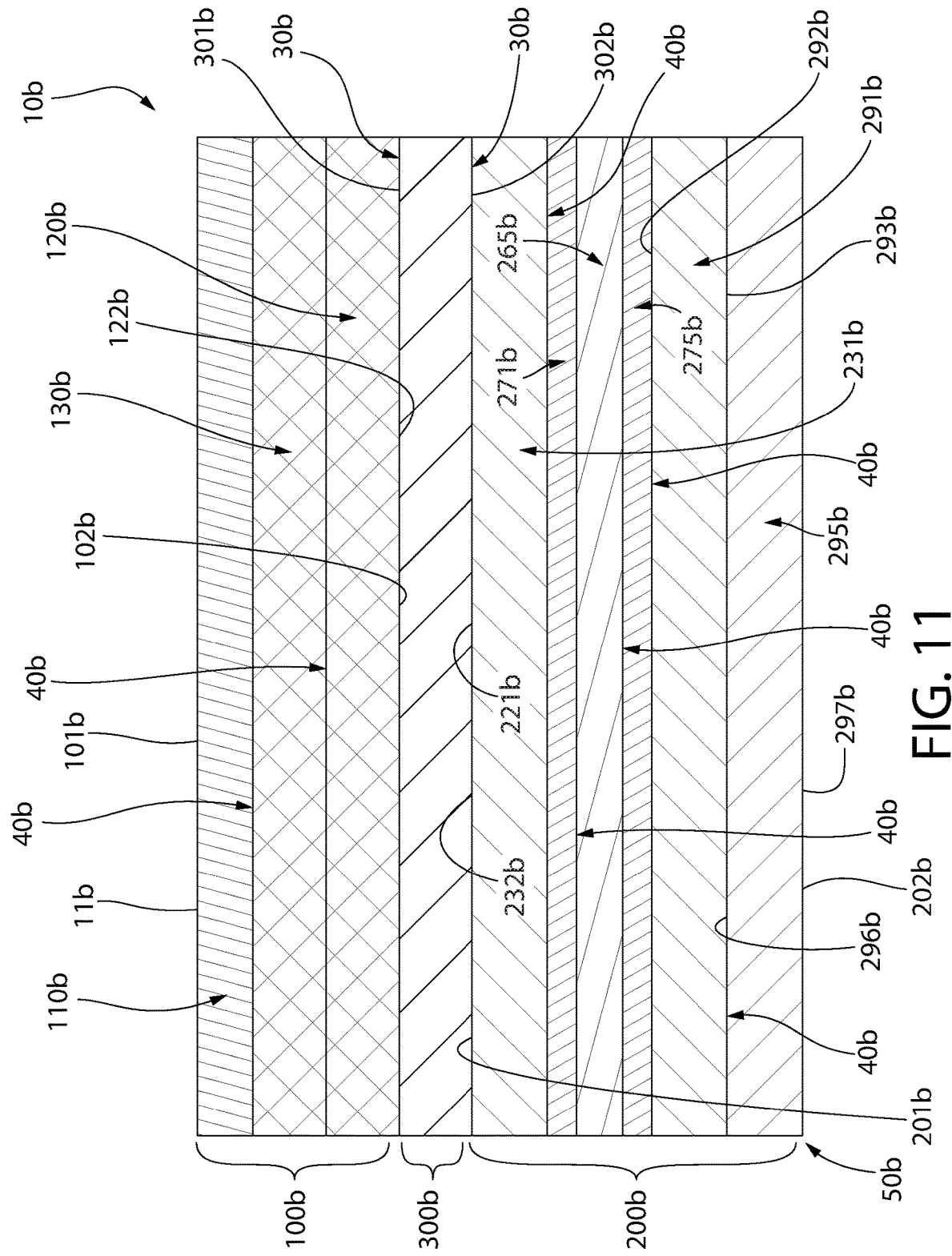
FIG. 11 is a cross-section view of a sheet taken along lines X-X of FIG. 1 according to another embodiment of the present invention that comprises the web of FIG. 10.
Figure 12:
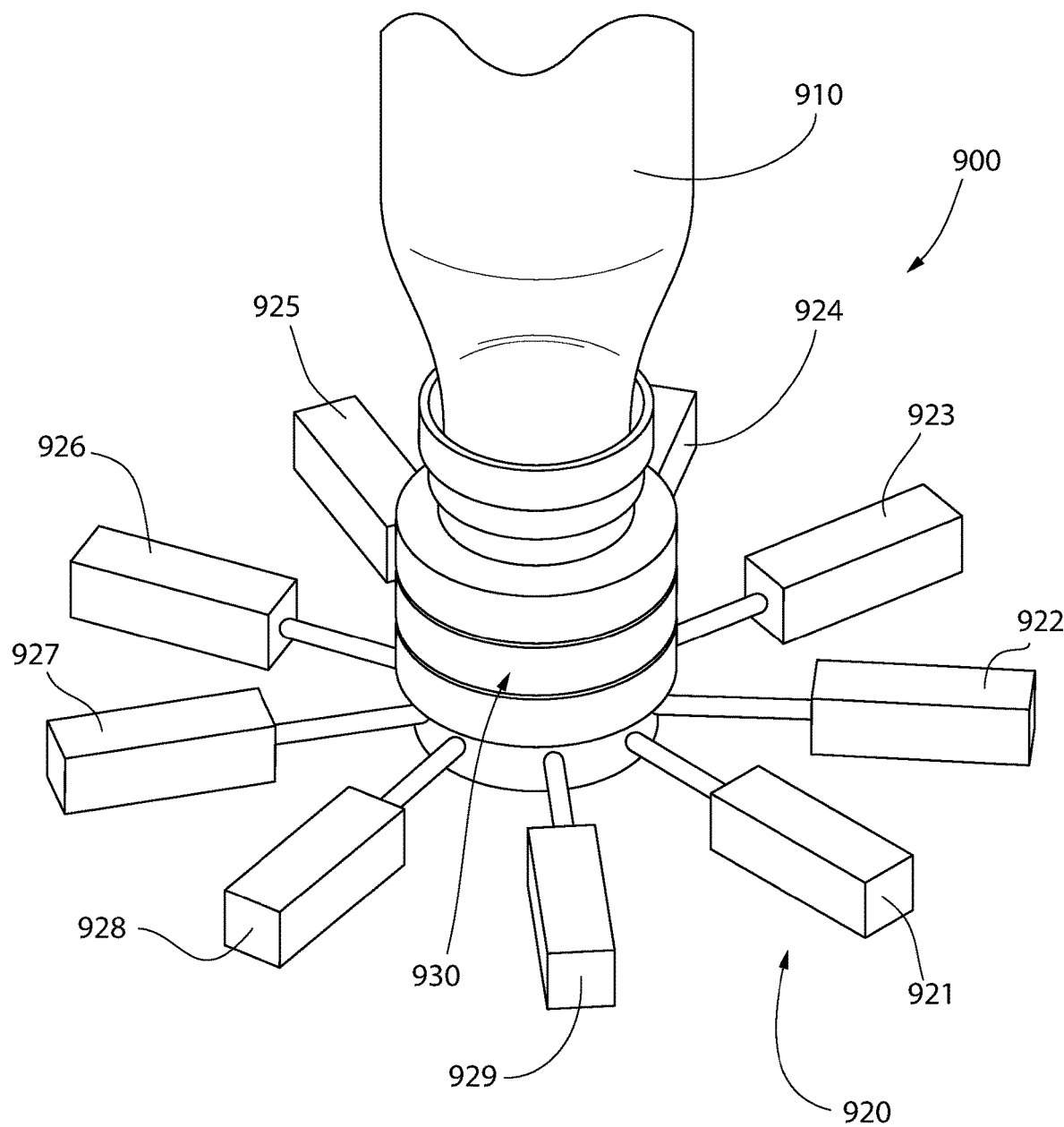
FIG. 12 is a blown-film processing apparatus according to some embodiments of the present invention.
Figure 13:
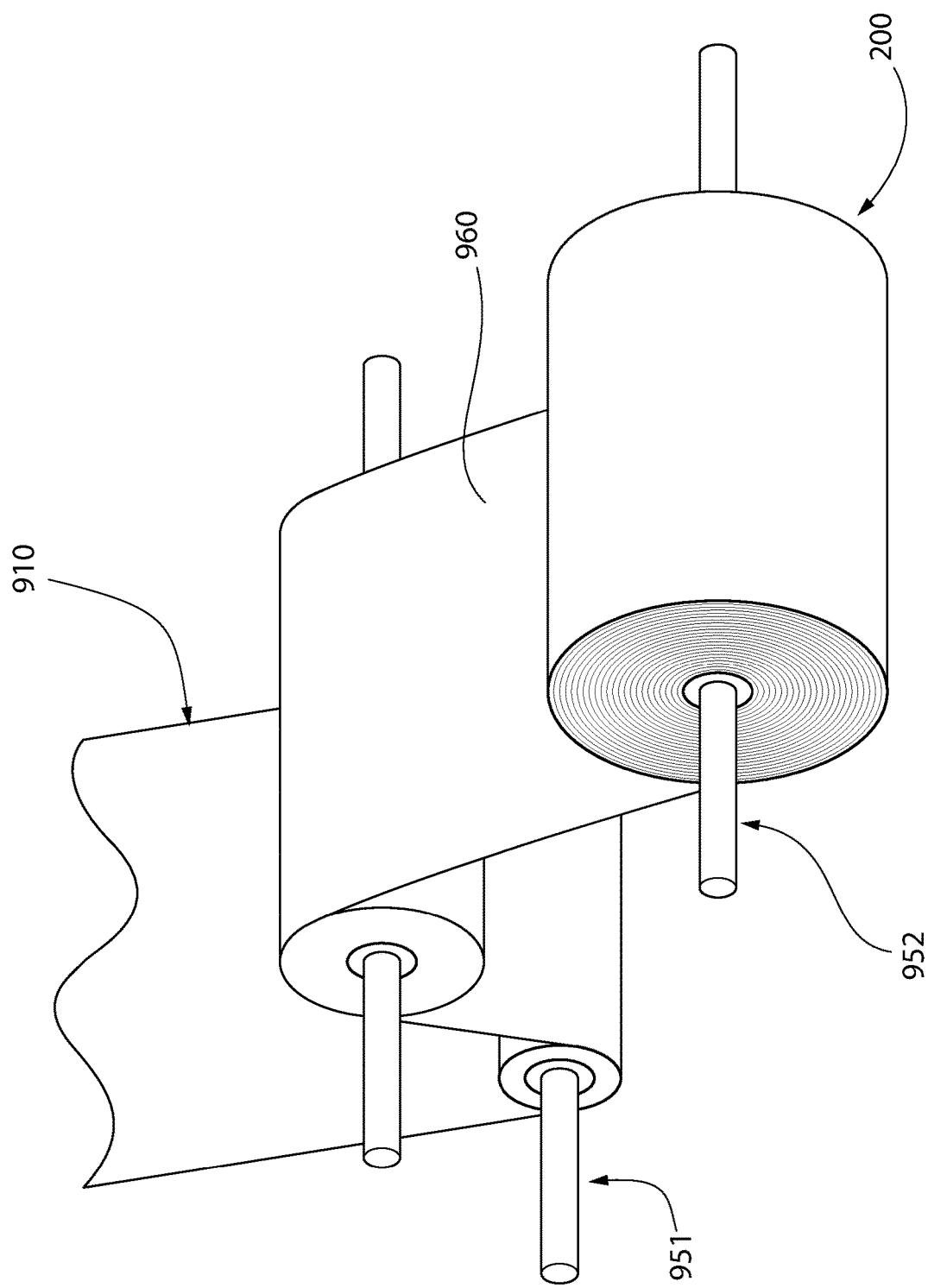
FIG. 13 is a web of the present invention after leaving the blown-film processing apparatus.

Referring now to FIGS. 10 and 11, a sheet 10b is illustrated in accordance with another embodiment of the present invention. The sheet 10b is similar to the sheets 10, 10a except as described herein below. The description of the sheet 10, 10b above generally applies to the sheet 10b described below except with regard to the differences specifically noted below. A similar numbering scheme will be used for the sheet 10b as with the sheet 10 except that the b-suffix will be used.

The sheet 10b may comprise a first web 100b, an intermediate sheet layer 300b, and a second web 200b. The second web 200b may be a multi-layer web (also referred to as a "second multi-layer web").

The second web 200b may comprise an uppermost layer 211b opposite a lowermost layer 212b. The second web 200b may comprise a upper portion 220b, a lower portion 280b, and a barrier portion 260b. The upper portion 220b of the second web 200b may comprise the uppermost layer 211b of the second web 200b and the lower portion 280b of the second web 200b may comprise the lowermost layer 212b of the second web 200b.

The upper portion 220b of the second web 200b may comprise a first layer 231b having a first major surface 232b opposite a second major surface 233b. The first layer 231b may be the sole layer of the upper portion 220b—i.e., the upper portion 220b consists of the first layer 231b.

The first major surface 232b of the first layer 231b of the upper portion 220b of the second web 200b may form the first major surface 201b of the second web 200b. Stated otherwise, the first major surface 201b of the second web 200b may comprise the first major surface 232b of the first layer 231b of the upper portion 220b of the second web 200b.

The first major surface 232b of the first layer 231b may form the uppermost surface 221b of the upper portion 220b of the second web 200b. Stated otherwise, the uppermost surface 221b of the upper portion 220b of the second web 200b may comprise the first major surface 232b of the first layer 231b.

The second major surface 233b of the first layer 231b of the upper portion 220b of the second web 200b may form the lowermost surface 222b of the upper portion 220b of the second web 200b. Stated otherwise, the lowermost surface 222b of the upper portion 220b of the second web 200b may comprise the second major surface 233b of the first layer 231b of the upper portion 220b of the second web 200b.

The first layer 231b of the upper portion 220b of the second web 200b may have a first thickness $t_{1b}$ as measured by the distance between the first major surface 232b and the second major surface 233b of the first layer 231b of the upper portion 220b of the second web 200b.

The first thickness $t_{1b}$ of the first layer 231b may range from about 10 μm to about 500 μm—including all thicknesses and sub-ranges there-between. In some embodiments, the first thickness $t_{1b}$ of the first layer 231b may range from about 20 μm to about 300 μm—including all thicknesses and sub-ranges there-between. In some embodiments, the first thickness $t_{1b}$ of the first layer 231b may range from about 40 μm to about 200 μm—including all thicknesses and sub-ranges there-between. In some embodiments, the first thickness $t_{1b}$ of the first layer 231b may be about 150 μm.

The first layer 231b of the upper portion 220b of the second web 200b may be formed from a polymeric material. The first layer 231b of the upper portion 220b of the second web 200b consist essentially of the polymeric material. The first layer 231b of the upper portion 220b of the second web 200b may consist of the polymeric material. The polymeric material may be high-density polyethylene ("HDPE"). The first layer 231b of the upper portion 220b of the second web 200b may consist essentially of HDPE. The first layer 231b of the upper portion 220b of the second web 200b may consist of HDPE.

The polymeric material that forms the first layer 231b of the upper portion 220b may be the same as the polymeric material described as forming the top layer 231 of the upper portion 220 of the second web 200 of the sheet 10 of the previous embodiment.

The lower portion 280b of the second web 200b may comprise a plurality of layers. The lower portion 280b may comprise a second layer 291b. The lower portion 280b may further comprise a third layer 295b.

The second layer 291b may have a first major surface 292b opposite a second major surface 293b. The first major surface 292b of the second layer 291b of the lower portion 280b of the second web 200b may form the uppermost surface 281b of the lower portion 280b of the second web 200b. Stated otherwise, the uppermost surface 281b of the lower portion 280b of the second web 200b may comprise the first major surface 292b of the second layer 291b of the lower portion 280b of the second web 200b.

The second layer 291b of the lower portion 280b of the second web 200b may have a second thickness $t_{5a}$ as measured by the distance between the first major surface 292b and the second major surface 293b of the second layer 291b of the lower portion 280b of the second web 200b.

The second thickness $t_{5b}$ of the second layer 291b may range from about 5 μm to about 100 μm—including all thicknesses and sub-ranges there-between. In some embodiments, the second thickness $t_{5b}$ of the second layer 291b may range from about 10 μm to about 50 μm—including all thicknesses and sub-ranges there-between. In some embodiments, the second thickness $t_{5b}$ of the second layer 291b may range from about 15 μm to about 40 μm—including all thicknesses and sub-ranges there-between. In some embodiments, the second thickness $t_{5b}$ of the second layer 291b may be about 22.5 μm.

The second layer 291b of the lower portion 280b of the second web 200b may be formed from a polymeric material. The second layer 291b of the lower portion 280b of the second web 200b consist essentially of the polymeric material. The second layer 291b of the lower portion 280b of the second web 200b may consist of the polymeric material. The polymeric material may be high-density polyethylene ("HDPE"). The second layer 291b of the lower portion 280b of the second web 200b may consist essentially of HDPE. The second layer 291b of the lower portion 280b of the second web 200b may consist of HDPE.

The polymeric material that forms the second layer 291b of the lower portion 280b may be the same as the polymeric material described as forming the top layer 291 of the lower portion 280 of the second web 200 of the sheet 10 of the previous embodiment.

The third layer 295b may have a first major surface 296b opposite a second major surface 297b. The second major surface 297b of the third layer 295b of the lower portion 280b of the second web 200b may form the lowermost surface 282b of the lower portion 280b of the second web 200b. Stated otherwise, the lowermost surface 282b of the lower portion 280b of the second web 200b may comprise the second major surface 293b of the third layer 295b of the lower portion 280b of the second web 200b.

The third layer 295b of the lower portion 280b of the second web 200b may have a third thickness $t_{6b}$, as measured by the distance between the first major surface 296b and the second major surface 297b of the third layer 295b of the lower portion 280b of the second web 200b.

The third thickness $t_{6b}$ of the third layer 295b may range from about 5 μm to about 100 μm—including all thicknesses and sub-ranges there-between. In some embodiments, the third thickness $t_{6b}$ of the third layer 295b may range from about 10 μm to about 50 μm—including all thicknesses and sub-ranges there-between. In some embodiments, the third thickness $t_{6b}$ of the third layer 295b may range from about 15 μm to about 40 μm—including all thicknesses and sub-ranges there-between. In some embodiments, the third thickness $t_{6b}$ of the third layer 295b may be about 22.5 μm.

The third layer 295b of the lower portion 280b of the second web 200b may be formed from a polymeric material. The third layer 295b of the lower portion 280b of the second web 200b consist essentially of the polymeric material. The third layer 295b of the lower portion 280b of the second web 200b may consist of the polymeric material. The polymeric material may be high-density polyethylene ("HDPE"). The third layer 295b of the lower portion 280b of the second web 200b may consist essentially of HDPE. The third layer 295b of the lower portion 280b of the second web 200b may consist of HDPE.

The polymeric material that forms the third layer 295b of the lower portion 280b may be the same as the polymeric material described as forming the bottom layer 295 of the lower portion 280 of the second web 200 of the sheet 10 of the previous embodiment.

According to this embodiment, the second major surface 293b of the second layer 291b of the lower portion 280b may face the first major surface 296b of the third layer 295b of the lower portion 280b of the second web 200b.

The resulting sheet 10b formed from the second web 200b according to this embodiment may comprise a number of blown-film interfaces 40b as well as laminate interfaces 30b.

A lamination interface 30b may exist between the second web 200b and the intermediate sheet layer 300b. Specifically, a lamination interface 30b may exist between the second major surface 302b of the sheet intermediate layer 300b and the first major surface 201b of the second web 200b. A lamination interface 30b may exist between the sheet intermediate layer 300b and the upper portion 220b of the second web 200b. Specifically, a lamination interface 30b may exist between the second major surface 302b of the sheet intermediate layer 300b and the uppermost surface 221b of the upper portion 220b of the second web 200b. A lamination interface 30a may exist between the sheet intermediate layer 300b and the first layer 231b of the upper portion 220a of the second web 200b. Specifically, a lamination interface 30b may exist between the second major surface 302b of the sheet intermediate layer 300b and the first major surface 232a of the first layer 231b of the upper portion 220a of the second web 200b.

A blown film interface 40b may exist between the first layer 231b of the second web 200 and the barrier portion 260b. Specifically, a blown film interface 40b may exist between the second major surface 233b of the first layer 231b of the upper portion 220b of the second web 200b and the uppermost surface 261b of the barrier portion 260b. A blown film interface 40b may exist between the first layer 231b of the second web 200 and the first tie layer 271b of the barrier portion 260b. Specifically, a blown film interface 40b may exist between the second major surface 233b of the first layer 231b of the upper portion 220b of the second web 200b and the first major surface 272b of the first tie layer 271b of the barrier portion 260b of the second web 200b.

A blown film interface 40b may exist between the second layer 291b of the second web 200 and the barrier portion 260b. Specifically, a blown film interface 40b may exist between the first major surface 292b of the second layer 291b of the lower portion 280b of the second web 200b and the lowermost surface 262b of the barrier portion 260b. A blown film interface 40b may exist between the second layer 291b of the second web 200 and the second tie layer 275b of the barrier portion 260b. Specifically, a blown film interface 40b may exist between the first major surface 292b of the second layer 291b of the lower portion 280b of the second web 200b and the second major surface 277b of the second tie layer 275b of the barrier portion 260b of the second web 200b.

A blown film interface 40b may exist between the second layer 291b and the third layer 295b of the lower portion 280 of the second web 200. Specifically, a blown film interface 40b may exist between the second major surface 293b of the second layer 291b of the lower portion 280b of the second web 200b and the first major surface 296b of the third layer 295b of the lower portion 290b of the second web 200.

EXAMPLES

The following materials were used to prepare the exemplary sheets.

HDPE 1—high-density polyethylene having a density ranging between 0.945 g/cm$^3$ to about 0.955 g/cm$^3$ and a melt index of about 0.8 g/10 min to about 1.2 g/10 min.

HDPE 2—high-density polyethylene having a density ranging between 0.96 g/cm$^3$ to about 0.97 g/cm$^3$ and a melt index of about 0.5 g/10 min to about 1.0 g/10 min.

Pigment—Titanium Dioxide

EVOH—ethylene vinyl alcohol polymer

Tie—anhydride-modified linear low density polyethylene ("AmLLDPE")

LLDPE—linear low-density polyethylene having a density ranging between 0.91 g/cm$^3$ to about 0.94 g/cm$^3$ and a melt index of about 0.3 g/10 min to about 3.0 g/10 min.

A first example sheet was prepared having the layers as set forth below in Table 1.

TABLE 1

|  | Thickness | Polymeric Material | Pigment |
| --- | --- | --- | --- |
| First Web | | | |
| Top Layer | 30 μm | 80 wt. % HDPE 1 | 20 wt. % TiO$_2$ |

TABLE 1-continued

|  | Thickness | Polymeric Material | Pigment |
|---|---|---|---|
| Intermediate Layer | 60 μm | 100 wt. % HDPE 2 | — |
| Bottom Layer |  | 100 wt. % HDPE 2 | — |
| Intermediate Sheet Layer | | | |
|  | 25 μm | 100 wt. % LDPE | — |
| Second Web | | | |
| Upper Portion | | | |
| Top Layer | 15 μm | 100 wt. % HDPE | — |
| First Intermediate Layer | 15-20 μm | 80 wt. % HDPE 2 | 20 wt. % TiO$_2$ |
| First Intermediate Layer | 15-20 μm | 80 wt. % HDPE 2 | 20 wt. % TiO$_2$ |
| Bottom Layer | 15-20 μm | 100 wt. % HDPE 2 | — |
| Barrier Portion | | | |
| First Tie Layer | 6 μm | 100 wt. % AmLLDPE | — |
| Barrier Layer | 15-20 μm | 100 wt. % EVOH | — |
| Second Tie Layer | 6 μm | 100 wt. % AmLLDPE | — |
| Lower Portion | | | |
| Top Layer | 15 μm | 100 wt. % HDPE 1 | — |
| Bottom Layer | 25 μm | 100 wt. % LLDPE | — |

The resulting sheet have a lamination interface between the first web and the intermediate sheet. The resulting sheet have a lamination interface between the second web and the intermediate sheet. Each of the layers within the first web were separated by a blown-film interface. Each of the layers within the second web were separated by a blown-film interface. The multi-layer structure of the resulting sheet exhibited a net stress of about zero—resulting in no deformation or curl in the absence of an external force.

What is claimed is:

1. A sheet comprising:
a polymeric multi-layer structure comprising:
a plurality of layers including an uppermost layer and a lowermost layer, each of the plurality of layers having a stress value;
wherein the stress value of at least two of the plurality of layers are non-zero and different from one another; and
wherein the multi-layer structure has a net stress value that is less than the greater stress value of the plurality of layers.

2. The sheet according to claim 1, wherein the stress value of at least three of the plurality of layers are different from one another.

3. The sheet according to claim 1, wherein the uppermost layer is formed of high density polyethylene and the lowermost layer is formed of one of linear low density polyethylene and low-density polyethylene.

4. The sheet according to claim 3, wherein multi-layer structure comprises a barrier layer located between the uppermost layer and the lowermost layer, wherein the barrier layer is formed of ethylene vinyl alcohol.

5. The sheet according to claim 4, wherein the multi-layer structure further comprises:
a first intermediate layer located between the uppermost layer and the barrier layer, the first intermediate layer formed of high density polyethylene;
a second intermediate layer located between the lowermost layer and the barrier layer, the second intermediate layer formed of high density polyethylene; and
a third intermediate layer located between the uppermost layer and the first intermediate layer, the third intermediate layer comprising high density polyethylene.

6. The sheet according to claim 5, wherein the multi-layer structure comprises a first barrier tie layer located between the barrier layer and the first intermediate layer and a second barrier tie layer located between the barrier layer and the second intermediate layer.

7. The sheet according to claim 1, wherein the sheet has a thickness ranging from about 150 μm to about 450 μm.

8. The sheet according to claim 1, wherein the multi-layer structure is substantially free of a metal-containing layer and a cellulosic-containing layer.

9. The sheet according to claim 1, wherein the multi-layer structure has a density ranging from about 0.950 g/cm$^3$ to about 0.965 g/cm$^3$.

10. The sheet according to claim 1, wherein the multi-layer structure has a melt flow index ranging from about 0.7 g/10 min to about 1.1 g/10 min.

* * * * *